(12) United States Patent
Fritz

(10) Patent No.: US 12,710,109 B1
(45) Date of Patent: Aug. 18, 2026

(54) BACKFLOW PREVENTER ANTI-THEFT SYSTEM AND METHOD

(71) Applicant: Brian M. Fritz, Denver, CO (US)

(72) Inventor: Brian M. Fritz, Denver, CO (US)

( * ) Notice: Subject to any disclaimer, the term of this patent is extended or adjusted under 35 U.S.C. 154(b) by 0 days.

(21) Appl. No.: 19/555,685

(22) Filed: Mar. 3, 2026

(51) Int. Cl.
*F16K 35/10* (2006.01)
*E05B 65/00* (2006.01)
*F16K 35/06* (2006.01)

(52) U.S. Cl.
CPC ............ *F16K 35/10* (2013.01); *E05B 65/006* (2013.01); *F16K 35/06* (2013.01)

(58) Field of Classification Search
CPC ........ F16K 35/06; F16K 35/10; E05B 65/006; E05B 73/0005; B65D 2211/00
See application file for complete search history.

(56) References Cited

U.S. PATENT DOCUMENTS 1,817,802 A * 8/1931 Cooper .................. F16K 35/10 70/178
2,623,380 A * 12/1952 Lee ......................... F16K 35/10 70/178
4,899,781 A * 2/1990 Monroe .................. F16K 35/10 292/322
6,164,318 A 12/2000 Dixon
7,455,277 B2 11/2008 Bishop et al.
10,082,229 B2 * 9/2018 Daniels ............... E05B 65/0089
2003/0024284 A1 2/2003 Erickson
2007/0095113 A1 5/2007 Hazelett
2012/0085433 A1 4/2012 Agbay et al.
2013/0025334 A1 1/2013 Vann et al.
2022/0063863 A1 3/2022 Cortez

FOREIGN PATENT DOCUMENTS

GB 670191 A * 4/1952 ............. F16K 35/10

* cited by examiner

*Primary Examiner* — Hailey K. Do
(74) *Attorney, Agent, or Firm* — Stephen B. Katsaros; Patent Engineering, LLC

(57) ABSTRACT

A backflow preventer anti-theft system secures a protective cage to a backflow preventer. The anti-theft system includes a tether having a proximal end configured to attach to the backflow preventer inside the protective cage, a distal end outside the protective cage, and a central portion extending through an opening of the protective cage. A lockbox includes a base configured to adjoin the protective cage, the base having a tether clamp configured to adjustably secure the tether and a staple configured to receive a lock. A cover is configured to lockably attach to the base, the cover having a hasp cooperatively associated with the staple. The anti-theft system operates in a service condition wherein the lock is disengaged, and the tether clamp is operable, and a locked condition wherein the tether clamp fixes the tether to the base, and the staple is engageable with the lock.

20 Claims, 20 Drawing Sheets

BACKFLOW PREVENTER ANTI-THEFT SYSTEM AND METHOD

TECHNICAL FIELD

The present disclosure relates generally to security devices for outdoor utility equipment, and more particularly to anti-theft systems and methods for securing protective cages to backflow preventers installed in water distribution systems.

BACKGROUND

Backflow preventers are devices installed in water distribution systems to protect potable water supplies from contamination due to backflow. These devices are commonly fabricated from brass and positioned above ground in accessible outdoor locations, enclosed within protective cages fabricated from expanded metal mesh. Due to the value of the brass material, backflow preventers have become frequent targets for theft, with thieves seeking to resell the metal as scrap. Public water agencies have reported numerous theft-related incidents within individual service areas, with the total number of affected units across the United States estimated to be substantial, potentially ranging from approximately 90,000 to over 300,000 units annually. The economic impact of backflow preventer theft includes emergency response costs, device replacement, reinstallation labor, inspection fees, and the addition of anti-theft hardware, with reported replacement costs commonly approaching or exceeding one thousand dollars per incident. Based on these per-unit costs, the total annual economic impact in the United States is conservatively estimated to exceed one hundred million dollars per year. Beyond direct financial losses, theft of a backflow preventer creates immediate service disruption, water loss, potential contamination risk, and administrative burden. Conventional protective cages are secured to ground surfaces using eye bolts or similar anchoring systems embedded in concrete pads.

SUMMARY

Backflow preventer theft represents a substantial economic burden, with annual losses in the United States conservatively estimated to exceed one hundred million dollars. Homeowners associations, municipalities, and commercial property owners face replacement costs commonly approaching or exceeding one thousand dollars per incident, including emergency response, device replacement, reinstallation labor, and inspection fees. Conventional protective cages secured by eye bolts embedded in concrete pads have proven vulnerable, as thieves can cut the eye bolt with a portable electric saw or forcibly remove inadequately secured anchors from the ground. The disclosed anti-theft system addresses this vulnerability by tethering the protective cage directly to the backflow preventer, thereby providing an additional layer of security that supplements existing locking mechanisms and prevents removal of the protective cage even if conventional eye bolts or padlocks are compromised. The anti-theft system can be installed by a landscaper or backflow preventer testing technician without permanent modification to the protective cage, providing a practical solution that maintains serviceability of the backflow preventer while materially reducing theft vulnerability.

According to an aspect of the present disclosure, a backflow preventer anti-theft system for securing a protective cage to a backflow preventer is provided. The anti-theft system includes a tether having a proximal end configured to attach to the backflow preventer inside the protective cage, a distal end outside the protective cage, and a central portion extending between the proximal end and the distal end and configured to extend through an opening of the protective cage. The anti-theft system further includes a lockbox having a base configured to adjoin the protective cage. The base includes a tether clamp configured to adjustably secure the tether at a fixed location on the central portion of the tether and a staple configured to receive a lock. The lockbox includes a cover configured to lockably attach to the base, the cover having a hasp cooperatively associated with the staple of the base. The anti-theft system operates in a service condition wherein the lock is disengaged from the staple and the tether clamp is operable, and a locked condition wherein the tether clamp fixes the tether to the base and the staple is engageable with the lock.

According to other aspects of the present disclosure, the anti-theft system may include one or more of the following features. The base of the lockbox may include a contour that mirrors a profile of the protective cage. The contour may include a plurality of button head fasteners configured to stabilize the base against a curved surface of the protective cage. The tether may be a wire rope, a chain, or a threaded rod. The proximal end of the tether may include a loop configured to engage the tether to the backflow preventer. The cover of the lockbox may include a lock access configured to provide access to a keyhole or a set of combination dials. The base may include a guide configured to prevent kinking of the tether. The distal end of the tether may be configured to pass through an opening of expanded metal mesh of the protective cage. The proximal end of the tether may include a thimble eye. The anti-theft system may further include a block adjoining the proximal end of the tether and configured to maintain a loop of the tether around the backflow preventer. The base may include a slot configured to accommodate varying expanded metal mesh spacing patterns. The base may be secured to the protective cage by at least a first fastener extending through the protective cage.

According to another aspect of the present disclosure, a method for securing a protective cage to a backflow preventer using an anti-theft system is provided. The method includes attaching a proximal end of a tether to the backflow preventer inside the protective cage. The method includes extending a central portion of the tether through an opening of the protective cage. The method includes positioning a distal end of the tether outside the protective cage. The method includes adjoining a base of a lockbox to the protective cage. The method includes adjustably securing the tether at a fixed location on the central portion of the tether using a tether clamp of the base. The method includes engaging a lock with a staple of the base. The method includes lockably attaching a cover to the base, the cover having a hasp cooperatively associated with the staple of the base.

According to other aspects of the present disclosure, the method may include one or more of the following features. The method may further include contouring the base to mirror a profile of the protective cage. The method may further include stabilizing the base against a curved surface of the protective cage using a plurality of button head fasteners. Extending the central portion of the tether may include passing the tether through an opening of expanded metal mesh of the protective cage. Attaching the proximal end of the tether to the backflow preventer may include engaging a loop of the tether around the backflow preventer. The method may further include accessing a keyhole or a set of combination dials through a lock access of the cover. The method may further include guiding the tether through a guide of the base to prevent kinking of the tether. The method may further include securing the base to the protective cage by extending at least a first fastener through the protective cage.

Further areas of applicability of the present disclosure will become apparent from the detailed description provided hereinafter. It should be understood that the detailed description and specific examples, while indicating various configurations, are intended for purposes of illustration only and are not intended to necessarily limit the scope of the disclosure.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, and together with the detailed description, explain the principles of the system. No attempt is made to show structural details in more detail than is necessary for a fundamental understanding of the system and the various ways in which it is practiced. The following figures of the drawing include.

Figure 1:
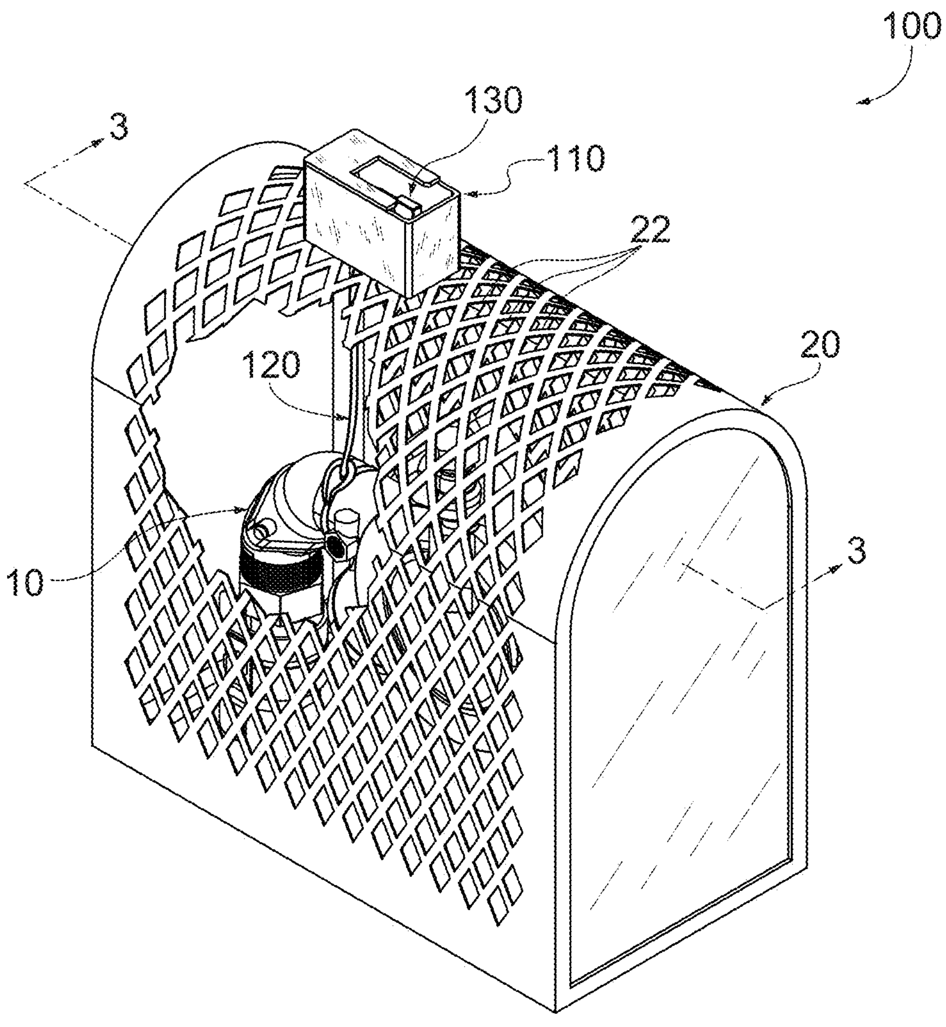
FIG. 1 illustrates a perspective view of an anti-theft system for a backflow preventer, showing the protective cage, tether, and lock assembly.

In the appended figures, similar components and/or features may have the same reference label. Further, various components of the same type may be distinguished by following the reference label with a dash and a second label that distinguishes among the similar components. If only the first reference label is used in the specification, the description is applicable to any one of the similar components having the same first reference label, irrespective of the second reference label. Where the reference label is used in the specification, the description is applicable to any one of the similar components having the same reference label.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered exemplary only, with the true scope and spirit being indicated by the following claims.

Backflow preventers are devices installed in water distribution systems to protect potable water supplies from contamination due to backflow. These devices are commonly fabricated from brass and are installed above ground in accessible outdoor locations. Due to the value of the brass material, backflow preventers have become frequent targets for theft, with thieves seeking to resell the metal as scrap. Public water agencies have reported numerous theft-related incidents within individual service areas, with the total number of affected units across the United States estimated to be substantial. The economic impact of backflow preventer theft includes emergency response costs, device replacement, reinstallation labor, inspection fees, and the addition of anti-theft hardware, with reported replacement costs commonly approaching or exceeding one thousand dollars per incident.

Protective cages are commonly installed over backflow preventers to deter theft. A typical protective cage includes expanded metal mesh material that allows visual inspection and access to the backflow preventer while providing physical protection. The protective cage is conventionally secured to a concrete pad or ground surface using eye bolts or similar ground anchoring systems. However, these conventional securing methods have proven vulnerable to theft. Thieves can cut the eye bolt using a portable electric saw, allowing the cage to be removed and the backflow preventer to be stolen. In other cases, the eye bolt may not be adequately secured in the concrete, allowing thieves to forcibly remove the eye bolt from the ground. Once the protective cage is removed, the backflow preventer can be quickly detached and stolen. The cost to repair and replace a stolen backflow preventer, including associated labor and inspection, can reach several thousand dollars per incident.

Existing solutions such as locks, reinforced cages, and enhanced ground anchoring systems, have proven only partially effective in preventing theft. These approaches add cost and complexity without eliminating the vulnerability associated with ground-based anchoring. Accordingly, there remains a need for improved systems and devices that deter, prevent, or materially reduce the theft of backflow preventers while maintaining code compliance, serviceability, and reasonable installation cost.

The disclosed anti-theft system addresses the vulnerability of conventional protective cage securing methods by securing the protective cage directly to the backflow preventer rather than relying solely on ground anchoring systems. The anti-theft system includes a tether that extends from the backflow preventer inside the protective cage, through an opening in the protective cage, to a lockbox positioned on the exterior of the protective cage. The tether passes through the mesh openings of the protective cage, connecting the backflow preventer to the lockbox. The lockbox includes a base configured to adjoin the protective cage and a tether clamp configured to adjustably secure the tether at a fixed location. A cover lockably attaches to the base, and a lock engages with a staple of the base to secure the assembly in a locked condition. This configuration augments existing protective cages to add additional security without requiring permanent modification to the cage. The anti-theft system can be installed by a landscaper or a backflow preventer testing technician, providing a practical solution that addresses the theft vulnerability while maintaining the serviceability of the backflow preventer.

Referring to FIG. 1, a perspective view 100 of an anti-theft system for a backflow preventer illustrates a backflow preventer anti-theft system for securing a protective cage 20 to a backflow preventer 10. The backflow preventer 10 is a device used to protect potable water supplies from contamination or pollution due to backflow, and the backflow preventer 10 is positioned within the protective cage 20. The protective cage 20 includes mesh openings 22 formed by expanded metal material that allows access to the interior while providing physical protection for the backflow preventer 10. An anti-theft system 110 is mounted on top of the protective cage 20 and is configured to augment existing cage security by attaching the protective cage 20 to the backflow preventer 10 without permanent modification to the protective cage 20.

With continued reference to FIG. 1, the anti-theft system 110 includes a tether 120 and a lockbox. The tether 120 extends from the anti-theft system 110 through the mesh openings 22 of the protective cage 20 and attaches to the backflow preventer 10 inside the protective cage 20. The tether 120 passes through the expanded metal mesh of the protective cage 20, connecting the backflow preventer 10 to the anti-theft system 110 positioned on the exterior top surface of the protective cage 20. The lockbox includes a base configured to adjoin the protective cage 20 and a cover configured to lockably attach to the base. A lock 130 is engaged with the anti-theft system 110 to secure the assembly in a locked condition.

In an illustrative configuration, the configuration secures the protective cage 20 to the backflow preventer 10 by tethering the protective cage 20 to the backflow preventer 10, rather than relying solely on ground anchoring systems such as eye bolts embedded in concrete pads. The mesh openings 22 of the protective cage 20 accommodate passage of the tether 120 while maintaining the protective function of the cage structure. The anti-theft system 110 is designed to be installed by a landscaper or backflow tester as a service offering, allowing for straightforward installation without specialized equipment or permanent modifications to the protective cage 20 or the backflow preventer 10. The anti-theft system 110 provides an additional layer of security that supplements existing locking mechanisms by preventing the removal of the protective cage 20 even if conventional eye bolts or padlocks are compromised.

Figure 2:
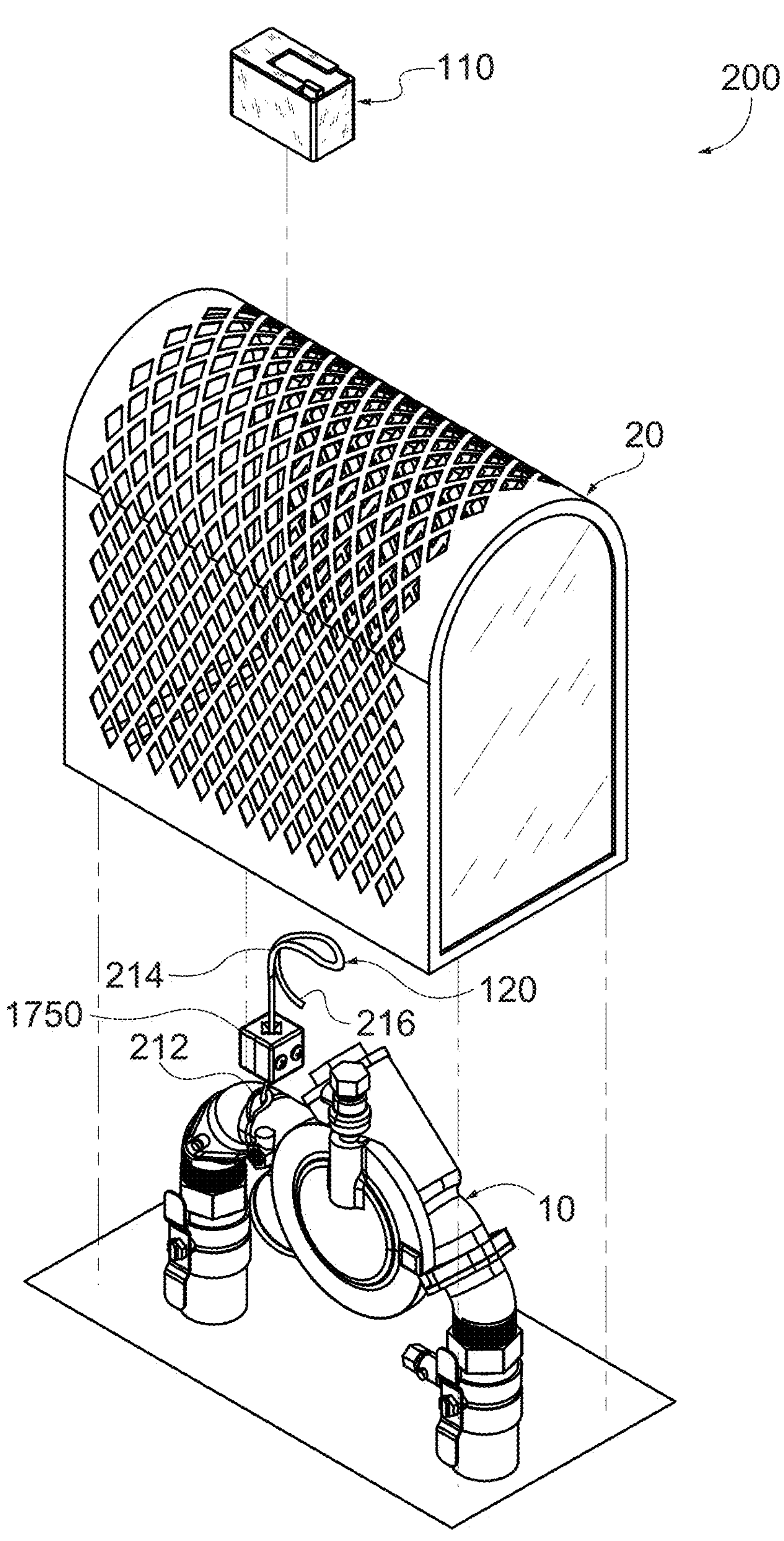
FIG. 2 illustrates an exploded view of the backflow preventer anti-theft system, showing the spatial relationship between the anti-theft system, protective cage, and backflow preventer.

FIG. 2 illustrates an exploded view 200 of the backflow preventer anti-theft system. The exploded view of the backflow preventer anti-theft system shows the spatial arrangement of the anti-theft system 110, the protective cage 20, and the backflow preventer 10. The anti-theft system 110 is positioned above the protective cage 20, and the protective cage 20 is positioned above the backflow preventer 10. The protective cage 20 includes a mesh pattern with openings that allow a tether 120 to pass through. The tether 120 extends from the anti-theft system 110 downward through the protective cage 20 toward the backflow preventer 10. The backflow preventer 10 is shown with associated piping and valve components positioned on a mounting surface, and the protective cage 20 has an arched profile configured to cover the backflow preventer 10 when assembled.

With continued reference to FIG. 2, the tether 120 includes a proximal end 212 configured to attach to the backflow preventer 10 inside the protective cage 20. The proximal end 212 forms a loop configured to engage the tether 120 to the backflow preventer 10. The loop of the proximal end 212 wraps around a portion of the backflow preventer 10 to secure the tether 120 to the backflow preventer 10. The proximal end 212 includes a thimble, which may be a tube thimble, that forms the loop around the backflow preventer 10. The thimble provides a thimble eye at a distal end of the tether 120, and the thimble eye reinforces the loop and prevents wear on the tether 120 where the tether 120 bends around the backflow preventer 10. The tube thimble configuration allows the installer to draw the loop tight around the pipe of the backflow preventer 10 while maintaining the structural integrity of the tether 120.

In an illustrative configuration, the tether 120 includes a central portion 214 extending between the proximal end 212 and the distal end. The central portion 214 is configured to extend through an opening of the protective cage 20, thereby connecting the backflow preventer 10 to the anti-theft system 110 mounted on top of the protective cage 20. The central portion 214 passes through the mesh openings of the protective cage 20, and the distal end of the tether 120 is positioned outside the protective cage 20 where the distal end can be secured by the anti-theft system 110. The arrangement of the proximal end 212, the central portion 214, and the distal end allows the tether 120 to tether the protective cage 20 directly to the backflow preventer 10, rather than relying on ground anchoring systems that can be defeated by cutting eye bolts or pulling anchors from concrete pads.

Figure 3:
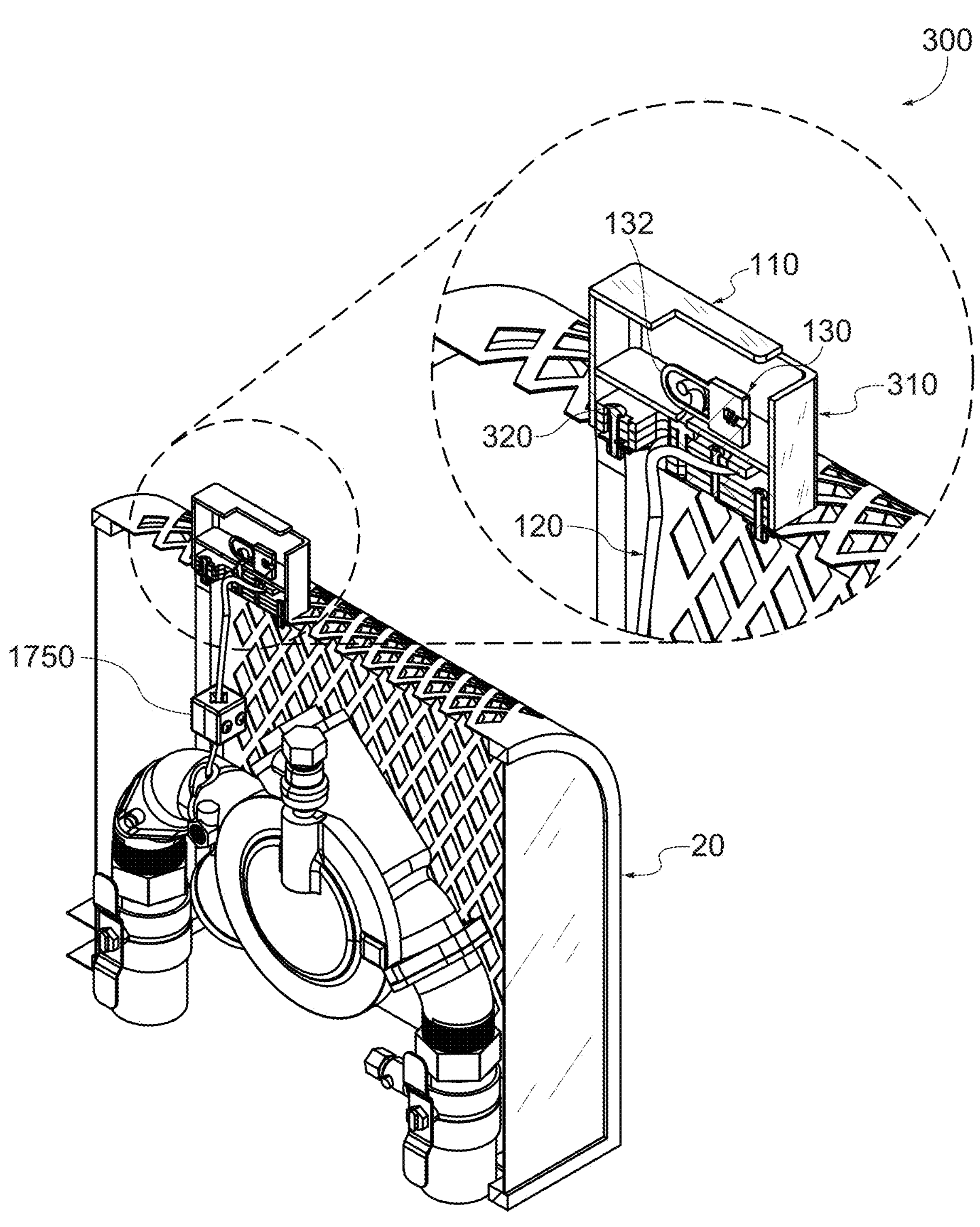
FIG. 3 illustrates a perspective view of a cross-section taken across plane 3-3 of FIG. 1, depicting the anti-theft system installed on the protective cage.

FIG. 3 illustrates a perspective view 300 of a cross-section taken across plane 3-3 as shown in FIG. 1, depicting the anti-theft system 110 installed on the protective cage 20. The perspective view of a cross-section taken across plane 3-3 300 shows the relationship between the anti-theft system 110 and the protective cage 20, with an enlarged detail callout providing additional clarity of the assembly components. The protective cage 20 is shown with the characteristic expanded metal mesh construction that allows the tether 120 to pass through the mesh openings 22. The anti-theft system 110 is positioned on top of the protective cage 20 and includes several components visible in the cross-sectional perspective. The tether 120 extends through the protective cage 20, passing through the mesh openings of the cage material to connect the backflow preventer 10 to the anti-theft system 110.

With continued reference to FIG. 3, the enlarged detail callout reveals the internal arrangement of the anti-theft system 110. A cover 310 is positioned over the assembly, providing protection for the internal components of the lockbox. A base 320 is visible within the assembly, and the base 320 is configured to adjoin the protective cage 20. The base 320 includes a tether clamp configured to adjustably secure the tether 120 at a fixed location on the central portion 214 of the tether 120. Additionally, the base 320 includes a staple configured to receive the lock 130. The cover 310 encloses the base 320 and associated components, thereby shielding the tether clamp from unauthorized access when the anti-theft system 110 is in the locked condition.

In an illustrative configuration, the lock 130 is shown engaged with the assembly, with a hasp 132 visible as part of the locking mechanism that secures the cover 310 to the base 320 of the anti-theft system 110. The hasp 132 is cooperatively associated with the staple of the base 320, such that when the lock 130 is engaged, the hasp 132 passes through the staple to prevent removal of the cover 310. The cross-sectional perspective demonstrates how the tether 120 passes through the protective cage 20 and is secured by the base 320 within the anti-theft system 110. The anti-theft system 110 may operate in a service condition, wherein the lock 130 is disengaged from the staple and the tether clamp is operable, allowing an installer or service technician to adjust the tension of the tether 120 or release the tether 120 for maintenance of the backflow preventer 10. Alternatively, the anti-theft system 110 may operate in a locked condition, wherein the tether clamp fixes the tether 120 to the base 320 and the staple is engageable with the lock 130, thereby preventing unauthorized removal of the protective cage 20 from the backflow preventer 10.

Figure 4:
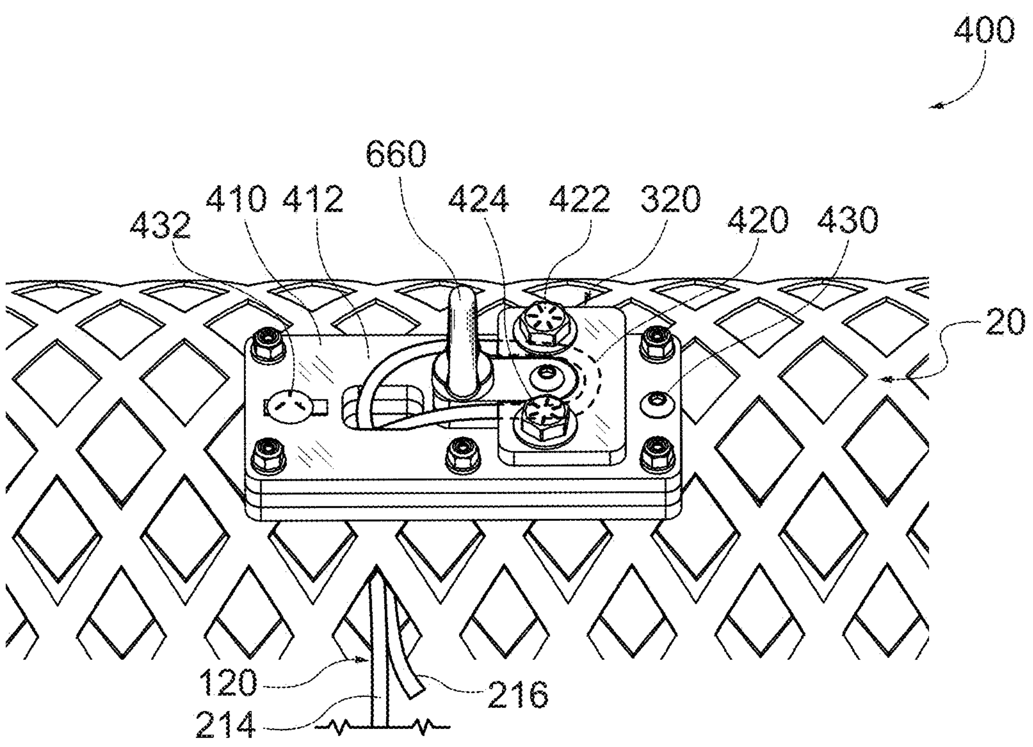
FIG. 4 illustrates a view of components of the anti-theft system mounted on the protective cage.

FIG. 4 illustrates an illustrative view 400 of the base attached to the cover, showing the anti-theft system components mounted on a protective cage 20. The protective cage 20 is formed from expanded metal mesh material with a curved profile. A base member 410 is positioned on top of the protective cage 20 and includes a window 412 through which a tether 120 passes. The tether 120 extends through the mesh openings of the protective cage 20, with a central portion 214 visible extending upward through the window 412. A thimble distal end is shown at the lower portion of the tether 120 where the tether 120 wraps around a pipe structure beneath the protective cage 20.

In an illustrative configuration, a guide 420 is positioned within the window 412 to direct the tether 120 and prevent kinking as the tether 120 transitions through the base member 410. The guide 420 may be a blue plastic insert that provides a soft fillet edge to prevent kinking of the tether 120 at a 90-degree bend. The guide 420 allows the tether 120 to transition smoothly between the vertical orientation extending from the backflow preventer and the horizontal orientation used for clamping. Additionally, the base member 410 includes an adjustment slot configured to accommodate varying expanded metal mesh spacing patterns of different cage manufacturers, thereby allowing the anti-theft system 110 to be installed on protective cages 20 having different mesh configurations.

With continued reference to FIG. 4, a base 320 is mounted on the base member 410 and is secured by a first fastener 422 and a second fastener 424. The first fastener 422 and the second fastener 424 are configured to apply clamping pressure to hold the tether 120 at a fixed location. The first fastener 422 and the second fastener 424 extend through a clamp plate and engage with threaded holes in the base member 410 to provide clamping force against the tether 120. Consequently, when the first fastener 422 and the second fastener 424 are tightened, the tether 120 is adjustably secured at a fixed location on the central portion 214 of the tether 120.

In an illustrative configuration, a first attachment fastener 430 and a second attachment fastener 432 extend through the base member 410 and the protective cage 20 to secure the base member 410 to the protective cage 20. The first attachment fastener 430 and the second attachment fastener 432 pass through openings in the expanded metal mesh of the protective cage 20 and are secured from below using washers and nuts. Moreover, a staple 660 is visible on the base member 410 and is configured to receive a lock for securing the assembly in a locked condition. The staple 660 extends upward from the base member 410 and cooperates with a hasp of a cover to enable engagement with the lock. The arrangement demonstrates how the base member 410 conforms to the curved surface of the protective cage 20 while providing a secure mounting platform for the base 320 and associated components.

Figure 5:
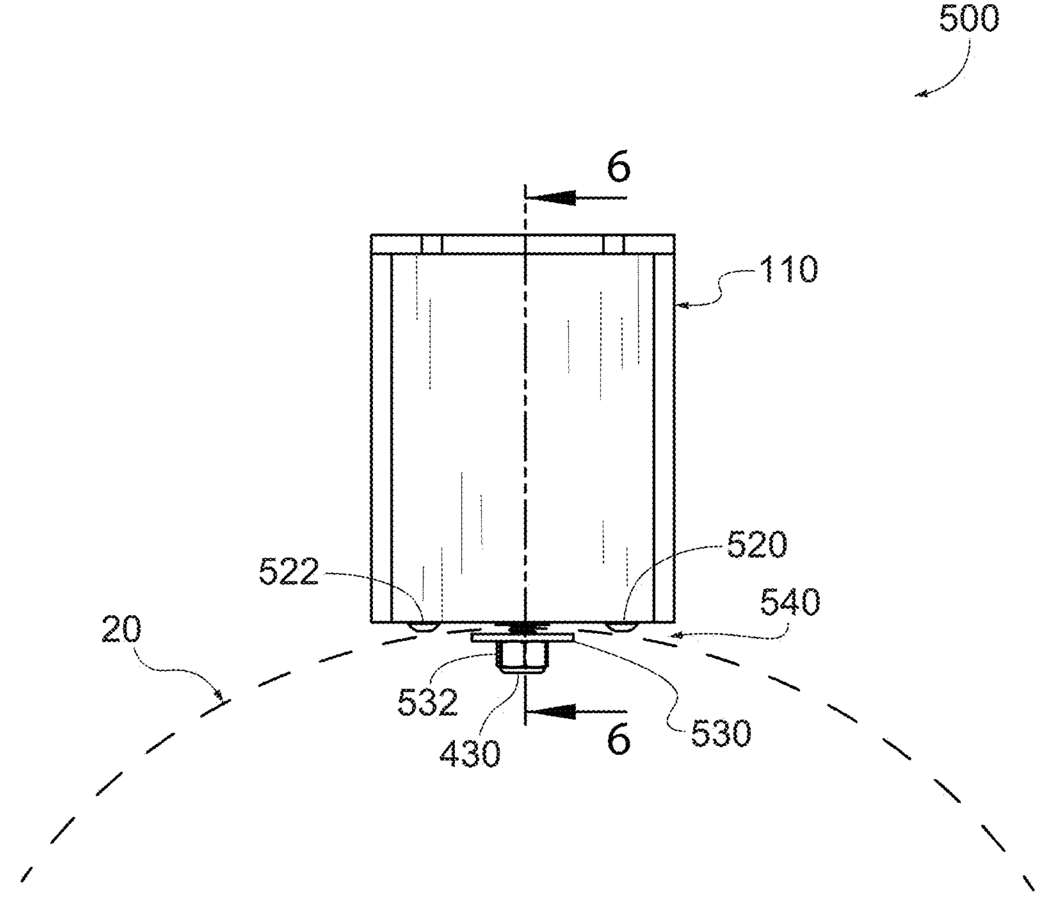
FIG. 5 illustrates a front view of the anti-theft system mounted on the protective cage, showing the attachment configuration and stabilizer arrangement.

FIG. 5 illustrates a front view 500 of the anti-theft system 110 mounted on a protective cage 20, showing the attachment configuration and stabilizer arrangement. The protective cage 20 is depicted with a dashed curved line representing a protective cage profile 540, indicating the curved surface of the cage. The anti-theft system 110 is positioned on top of the protective cage 20 and secured using a first attachment fastener 430 that extends through the cage material. As described previously, the base of the lockbox includes a contour that mirrors a profile of the protective cage 20. The protective cage profile 540 demonstrates the curved geometry of the protective cage 20 to which the base conforms, allowing the anti-theft system 110 to sit securely on the curved surface without rocking or instability.

With continued reference to FIG. 5, a first stabilizer 520 and a second stabilizer 522 are positioned on either side of the first attachment fastener 430. The first stabilizer 520 and the second stabilizer 522 are configured to engage the curved surface of the protective cage 20 and provide stability to the anti-theft system 110. The contour of the base includes a plurality of button head fasteners configured to stabilize the base against a curved surface of the protective cage 20. The first stabilizer 520 and the second stabilizer 522 may be button head bolts positioned on the bottom of the base that contact the curved surface of the protective cage 20. The first stabilizer 520 and the second stabilizer 522 add stability to the base and prevent tilting of the anti-theft system 110 during use. Additionally, the first stabilizer 520 and the second stabilizer 522 may serve as an impediment to prevent a thief from inserting a saw blade underneath the base, thereby providing an additional layer of security against tampering attempts.

In an illustrative configuration, the first attachment fastener 430 passes through the protective cage 20 and is secured from below using a washer 530 and a nut 532. The washer 530 distributes the clamping force across a larger area of the cage material, reducing stress concentration and preventing damage to the expanded metal mesh of the protective cage 20. The nut 532 threadably engages the first attachment fastener 430 to secure the anti-theft system 110 to the protective cage 20. The base is secured to the protective cage 20 by at least a first fastener extending through the protective cage 20, as demonstrated by the first attachment fastener 430 shown in FIG. 5. This configuration allows the base of the anti-theft system 110 to conform to the curved profile of the protective cage 20 while maintaining a secure attachment that resists tampering or removal attempts. The combination of the first stabilizer 520, the second stabilizer 522, the washer 530, and the nut 532 provides a robust mounting arrangement that accommodates the curved geometry of the protective cage 20.

Figure 6:
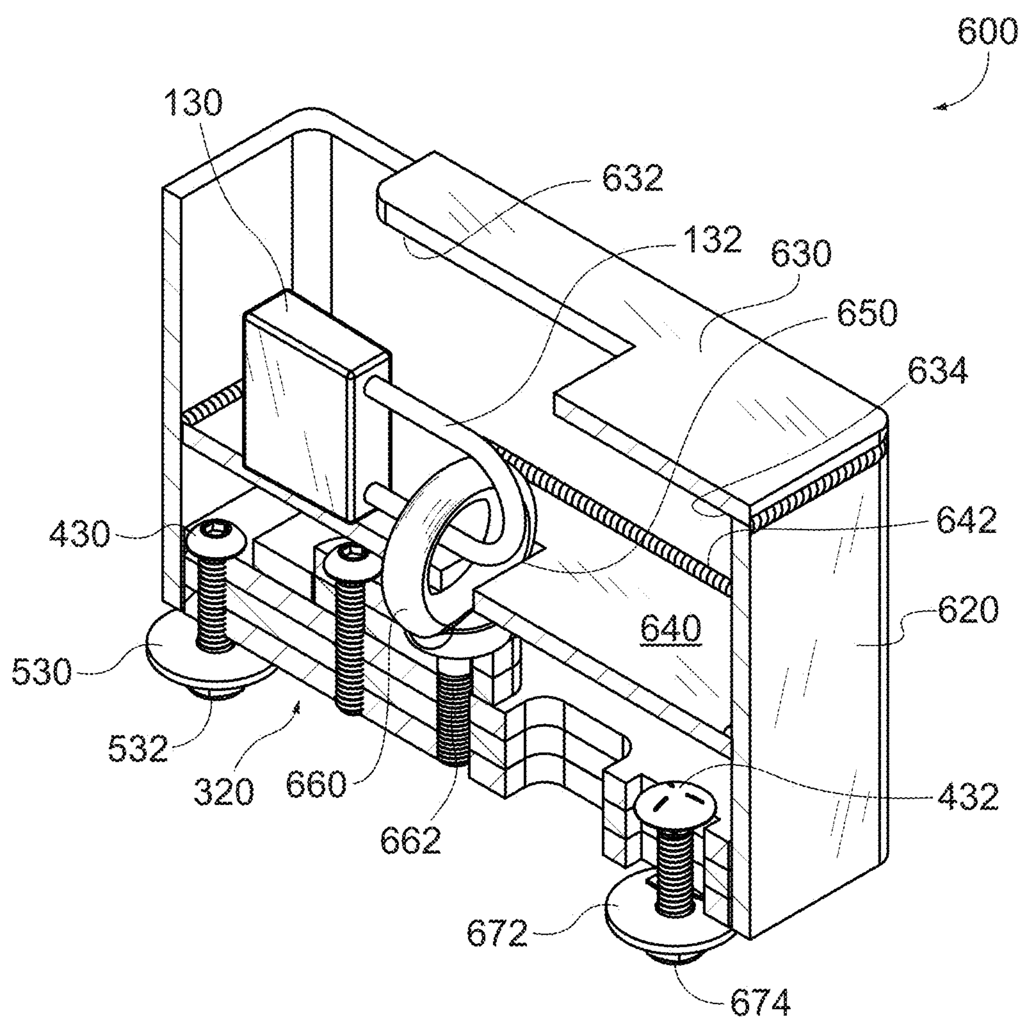
FIG. 6 illustrates a cross-sectional view of a lockbox assembly, revealing the internal arrangement and structural relationships of the components.

FIG. 6 illustrates a cross-sectional view 600 of a lockbox assembly. The cross-sectional view of the lockbox assembly reveals the internal arrangement and structural relationships of the components within the lockbox assembly. A cover 630 forms an enclosure and includes a lock access 632. The lock access 632 may be configured to provide access to a keyhole or a set of combination dials of the lock 130. The cover 630 defines an opening that allows a user to operate the locking mechanism while the cover 630 remains in place over the base 320 and associated components.

With continued reference to FIG. 6, a perimeter 620 defines the outer boundary of the lockbox assembly 600. In some cases, the perimeter 620 may be formed from a section of steel tubing, such as rectangular tubing, as shown. The perimeter 620 surrounds and protects the internal components of the lockbox assembly 600 when assembled. The cover 630 may be joined to adjacent components by a weld 634. The weld 634 secures the cover 630 to the perimeter 620, providing a rigid connection that resists tampering or separation of the cover 630 from the lockbox assembly.

In an illustrative configuration, a hasp plate 640 extends from the cover 630 and may be secured by a weld 642. The weld 642 attaches the hasp plate 640 to the cover 630, creating a unified structure that cooperates with the locking mechanism. The hasp plate 640 includes the hasp 132 that cooperates with the staple 660 positioned within a staple hole 650. The staple hole 650 receives the staple 660 and aligns the staple 660 with the hasp 132 when the lock 130 engages the lockbox assembly 600.

Additionally, the staple 660 includes a threaded stud 662 that extends downward through the lockbox assembly 600. The threaded stud 662 may engage with corresponding hardware to secure the staple 660 to the base 320. The first attachment fastener 430 extends through the lockbox assembly 600 and may be secured on the underside by a washer 530 and a nut 532. The washer 530 distributes the clamping force across a larger area, while the nut 532 threadably engages the first attachment fastener 430 to secure the lockbox assembly 600 to the protective cage 20.

Moreover, the second attachment fastener 432 similarly extends through the lockbox assembly 600 and may be secured by a washer 672 and a nut 674. The first attachment fastener 430 and the second attachment fastener 432 serve to attach the lockbox assembly 600 to the protective cage 20. The cross-sectional view of lockbox assembly 600 demonstrates how the various components are arranged to provide structural integrity and functional operation, with the staple 660 positioned to receive the hasp 132 when the lock 130 engages the lockbox assembly 600.

Figure 7:
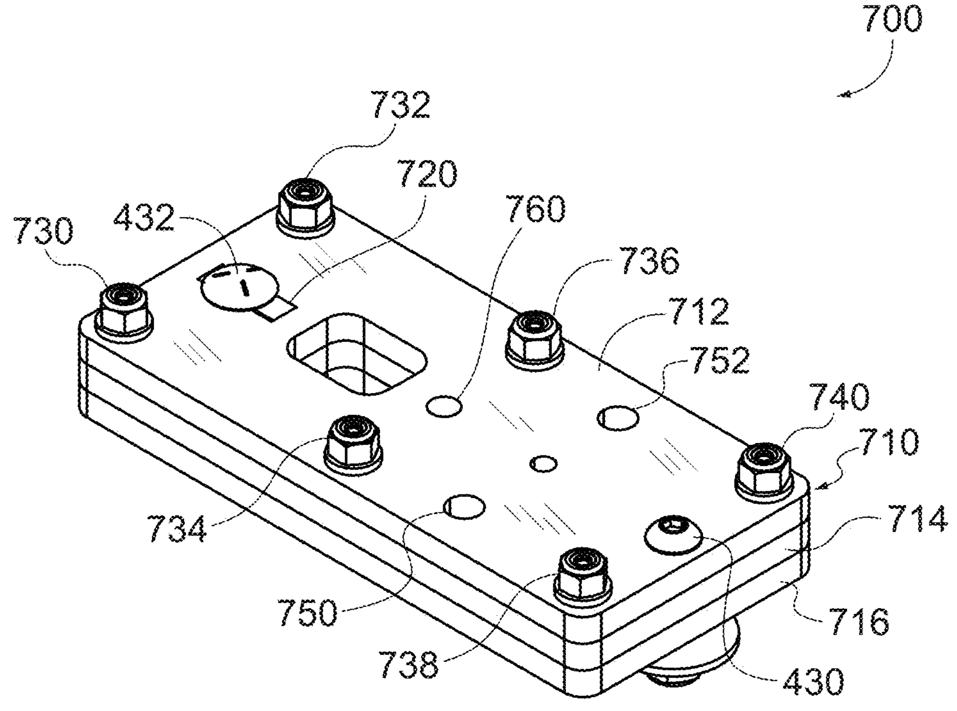
FIG. 7 illustrates a perspective view of a base assembly, showing the stacked plate construction and fastener arrangement.

FIG. 7 illustrates a perspective view 700 of a base assembly including a base assembly 710. The base assembly 710 includes a stacked plate construction configured to achieve sufficient thread engagement for clamping bolts. The base assembly 710 includes a top plate 712, a middle plate 714, and a bottom plate 716 that are sandwiched together. The top plate 712, the middle plate 714, and the bottom plate 716 may each be made from one-fourth inch-thick material that can be laser cut or plasma cut. The stacked configuration of the top plate 712, the middle plate 714, and the bottom plate 716 provides adequate thread depth for securing fasteners while accommodating manufacturing constraints associated with material thickness limitations.

With continued reference to FIG. 7, the top plate 712, the middle plate 714, and the bottom plate 716 are secured together by a plurality of fasteners positioned around the perimeter of the base assembly 710. A first fastener 730, a second fastener 732, a third fastener 734, a fourth fastener 736, a fifth fastener 738, and a sixth fastener 740 extend through aligned holes in the top plate 712, the middle plate 714, and the bottom plate 716. The first fastener 730, the second fastener 732, the third fastener 734, the fourth fastener 736, the fifth fastener 738, and the sixth fastener 740 may each include a nylon lock nut configuration to prevent loosening during use. The fasteners maintain the top plate 712, the middle plate 714, and the bottom plate 716 in a fixed relationship relative to one another.

In an illustrative configuration, the base assembly 710 includes an adjustment slot 720 formed through the top plate 712, the middle plate 714, and the bottom plate 716. The adjustment slot 720 is configured to accommodate varying expanded metal mesh spacing patterns of a protective cage. The adjustment slot 720 provides flexibility in positioning the base assembly 710 relative to the mesh openings of the protective cage, allowing the base assembly 710 to be installed on protective cages having different mesh configurations. Additionally, a first threaded hole 750 and a second threaded hole 752 are positioned adjacent to the adjustment slot 720. The first threaded hole 750 and the second threaded hole 752 are configured to receive fasteners for securing a tether clamp to the base assembly 710.

Moreover, a staple hole 760 is formed in the base assembly 710 and extends through the top plate 712, the middle plate 714, and the bottom plate 716. The staple hole 760 is configured to receive a staple for engagement with a lock. The staple hole 760 is positioned to allow a staple to extend upward from the base assembly 710, thereby providing a secure attachment point for a lock that secures a cover to the base assembly 710. Consequently, the base assembly 710 may be attached to the protective cage using a first attachment fastener 430 and a second attachment fastener 432 that extend through the base assembly 710. The first attachment fastener 430 and the second attachment fastener 432 may include ¼ inch-20×1.25 inch button head hex socket cap screw bolts or carriage bolts with nylon lock nuts, allowing the base assembly 710 to be mounted to the protective cage from above with corresponding nuts and washers positioned beneath the cage surface.

Figure 8:
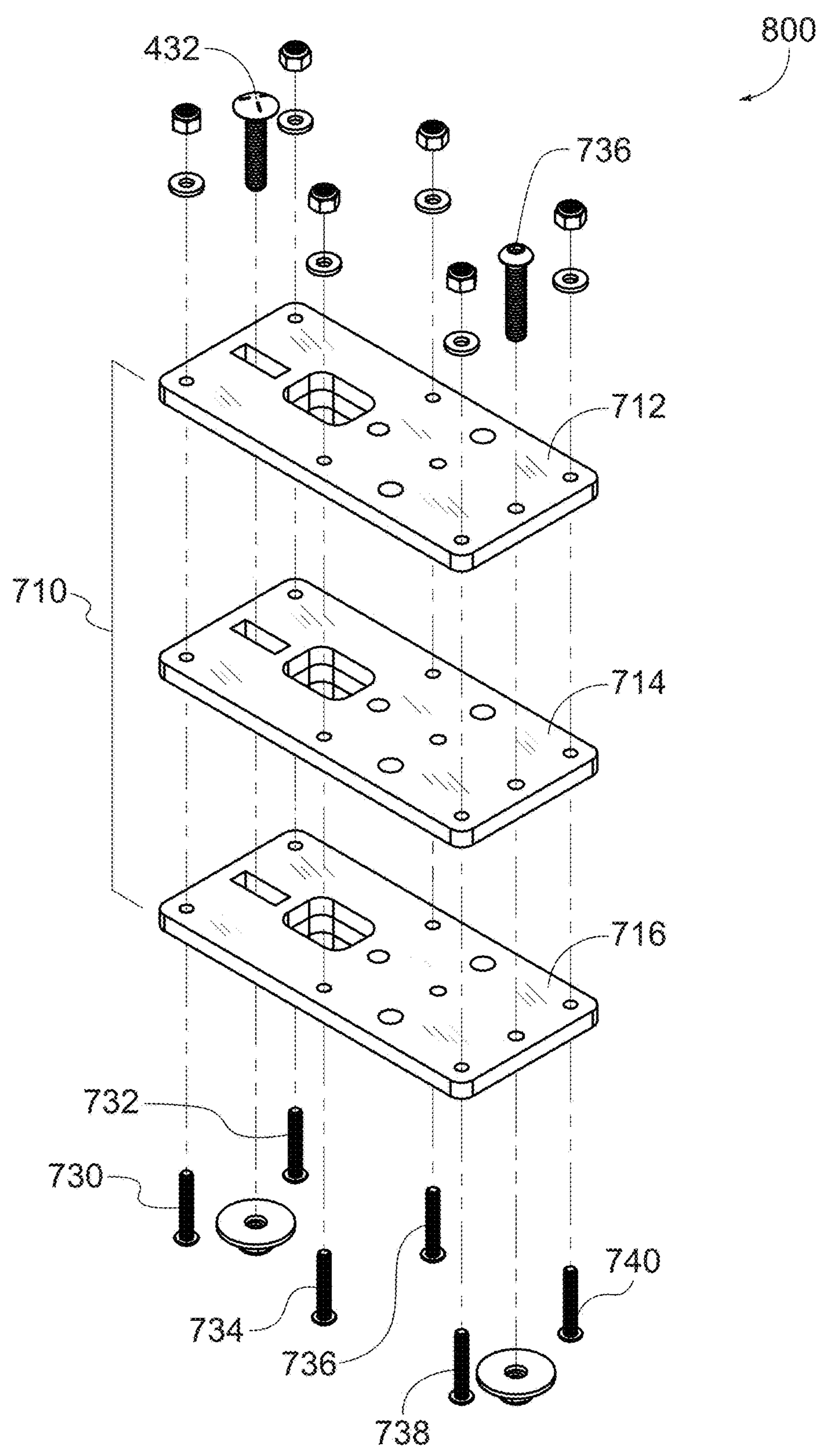
FIG. 8 illustrates an exploded view of the base assembly of FIG. 7, showing the top plate, middle plate, and bottom plate with associated fasteners.

FIG. 8 illustrates an exploded view 800 of the base assembly. The exploded view of the base assembly 800 shows the base assembly 710 comprising three stacked plates, including a top plate 712, a middle plate 714, and a bottom plate 716. The top plate 712, the middle plate 714, and the bottom plate 716 are configured to be assembled to form the base assembly 710. The stacked plate configuration provides sufficient thread engagement for tether clamp fasteners while accommodating manufacturing constraints associated with material thickness limitations.

In an illustrative configuration, a plurality of fasteners secures the three plates together. The plurality of fasteners includes a first fastener 730, a second fastener 732, a third fastener 734, a fourth fastener 736, a fifth fastener 738, and a sixth fastener 740. The first fastener 730, the second fastener 732, the third fastener 734, the fifth fastener 738, and the sixth fastener 740 are shown as button head socket cap screws with corresponding washers and nylon lock nuts positioned to pass through aligned holes in the top plate 712, the middle plate 714, and the bottom plate 716. The fourth fastener 736 appears at multiple locations around the perimeter of the plates. A second attachment fastener 432 is shown at the top of the exploded view of the base assembly 800, configured to secure the base assembly 710 to a protective cage.

Additionally, the top plate 712, the middle plate 714, and the bottom plate 716 each include a rectangular window opening and a plurality of through holes arranged in a pattern to receive the fasteners. The button head socket cap screws pass through the aligned holes in each plate, with washers distributing clamping force and nylon lock nuts preventing loosening during use. The stacked configuration of the base assembly 710 allows for manufacturing using thinner plate stock that can be laser cut or plasma cut, while the combined thickness of the three plates provides adequate thread depth for the tether clamp fasteners. The base assembly 710 may alternatively be manufactured as a single thick plate when produced at scale rather than multiple stacked plates, thereby eliminating the need for the fasteners that join the individual plates together.

Figure 9:
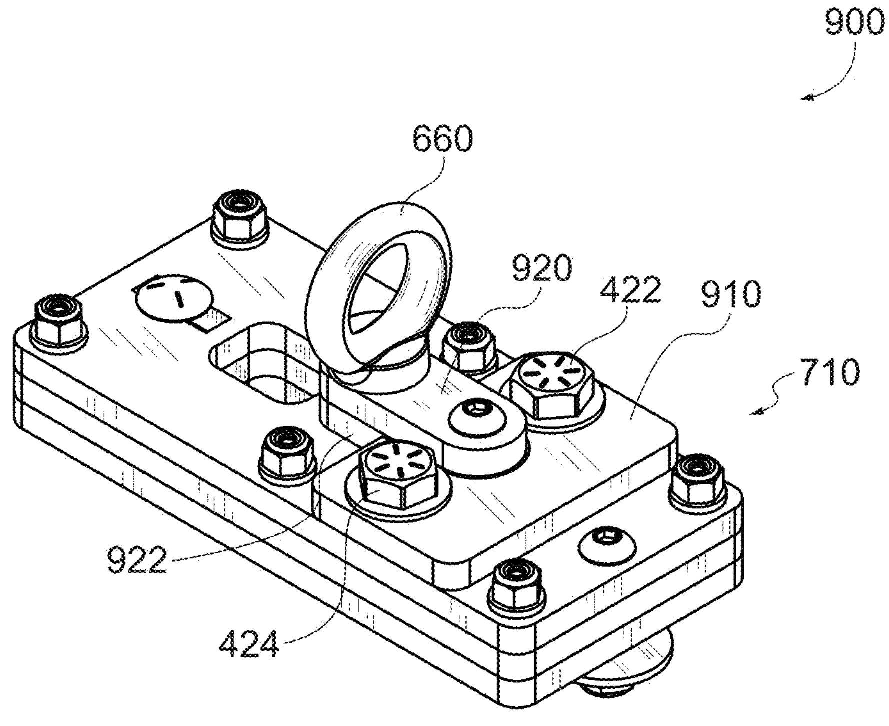
FIG. 9 illustrates a perspective view of the base assembly with the staple, tether clamp, and guide components.

Referring to FIG. 9, a perspective view 900 of the base assembly with the staple, the tether clamp, and the guide illustrates the arrangement of components configured to secure the tether 120 to the protective cage 20. The base assembly 710 serves as a foundation for mounting the tether securing components. A clamp plate 910 is positioned on the base assembly 710 and is configured to apply pressure to the tether 120 when the first fastener 422 and the second fastener 424 are tightened. The first fastener 422 and the second fastener 424 may include ⅜ inch-16×1-inch hex head screw bolts with ⅜ inch flat washers. The first fastener 422 and the second fastener 424 extend through the clamp plate 910 and engage with threaded holes in the base assembly 710, thereby providing clamping force against the tether 120 to hold the tether 120 at a fixed location.

With continued reference to FIG. 9, a top guide 920 and a bottom guide 922 are positioned adjacent to the base 320 to direct the path of the tether 120 and prevent kinking of the tether 120 as the tether 120 passes through the base assembly 710. The top guide 920 and the bottom guide 922 provide curved surfaces that allow the tether 120 to transition smoothly between a vertical orientation extending from the backflow preventer 10 and a horizontal orientation for clamping by the clamp plate 910. The staple 660 extends upward from the base assembly 710 and is configured to receive a lock 130 for securing the cover 310 to the base 320. In an illustrative configuration, the top guide 920 is positioned above the clamp plate 910, and the bottom guide 922 is positioned below the clamp plate 910, thereby guiding the tether 120 through the clamping region while maintaining a smooth bend radius that reduces stress on the tether 120.

Figure 10:
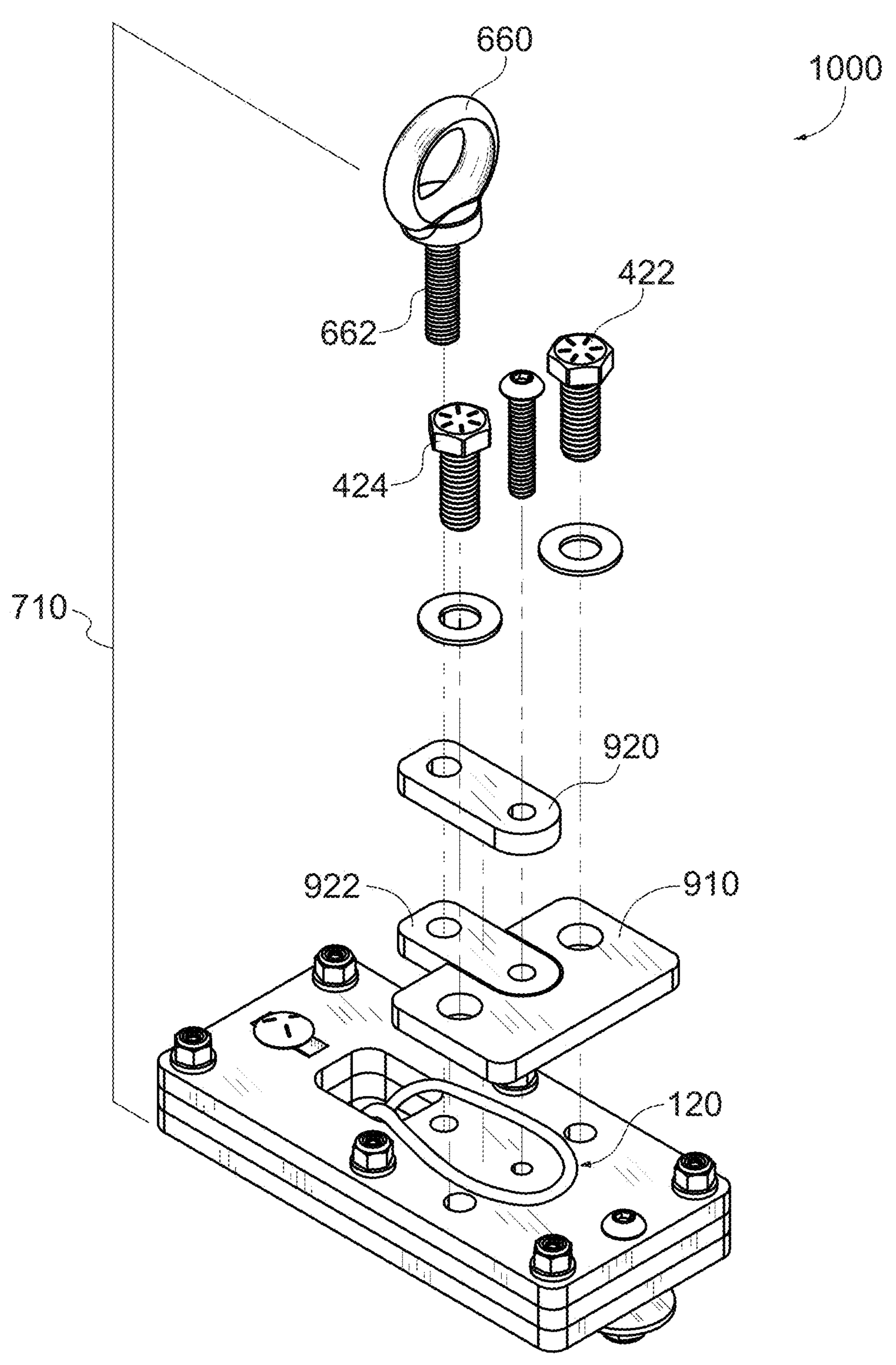
FIG. 10 illustrates an exploded view of a base assembly, showing the relationship between components used to secure the tether.

FIG. 10 illustrates an exploded view 1000 of the base assembly, showing the relationship between components used to secure the tether 120 to the protective cage 20. The exploded view of the base assembly depicts the vertical arrangement and assembly sequence of the staple 660, the first fastener 422, the second fastener 424, the top guide 920, the clamp plate 910, the bottom guide 922, and the base 320. Dashed lines in the exploded view of the base assembly indicate the vertical alignment of the components, demonstrating how each component stacks and aligns during assembly to form the complete base assembly.

In an illustrative configuration, the staple 660 includes a threaded stud 662 extending downward from the U-shaped portion of the staple 660. The threaded stud 662 passes through a corresponding hole in the base 320 and can be secured from below. The staple 660 extends upward from the base 320 when assembled and receives a lock to secure the cover to the base 320. Adjacent to the staple 660, the first fastener 422 and the second fastener 424 are positioned, each including hex head bolts with threaded shanks configured to engage with threaded holes in the base 320.

Additionally, washers are shown aligned with the first fastener 422 and the second fastener 424 along the dashed lines indicating the assembly direction. The washers distribute clamping force across a larger surface area when the first fastener 422 and the second fastener 424 are tightened. The top guide 920 is positioned below the washers and includes an elongated shape with two holes configured to receive the first fastener 422 and the second fastener 424. The top guide 920 provides a curved surface that allows the tether 120 to transition smoothly as the tether 120 passes through the base assembly.

Moreover, the clamp plate 910 is shown below the top guide 920 and includes a curved slot and corresponding holes for the first fastener 422 and the second fastener 424. The clamp plate 910 works in conjunction with the top guide 920 to secure the tether 120 at a fixed location when the first fastener 422 and the second fastener 424 are tightened. The bottom guide 922 is positioned beneath the clamp plate 910 and provides additional support and guidance for the tether 120, preventing kinking of the tether 120 as the tether 120 transitions between vertical and horizontal orientations.

In an illustrative configuration, the base 320 is shown at the bottom of the exploded view of the base assembly 1000 and includes an opening configured to receive the tether 120 and the associated clamping components. The base 320 includes multiple holes and fastener locations arranged to receive the staple 660, the first fastener 422, and the second fastener 424. When assembled, the staple 660, the first fastener 422, the second fastener 424, the top guide 920, the clamp plate 910, and the bottom guide 922 are assembled onto the base 320 to form the complete base assembly. An E-clip can be used to keep a carriage bolt from falling out during installation of the base assembly to the protective cage 20.

Figure 11:
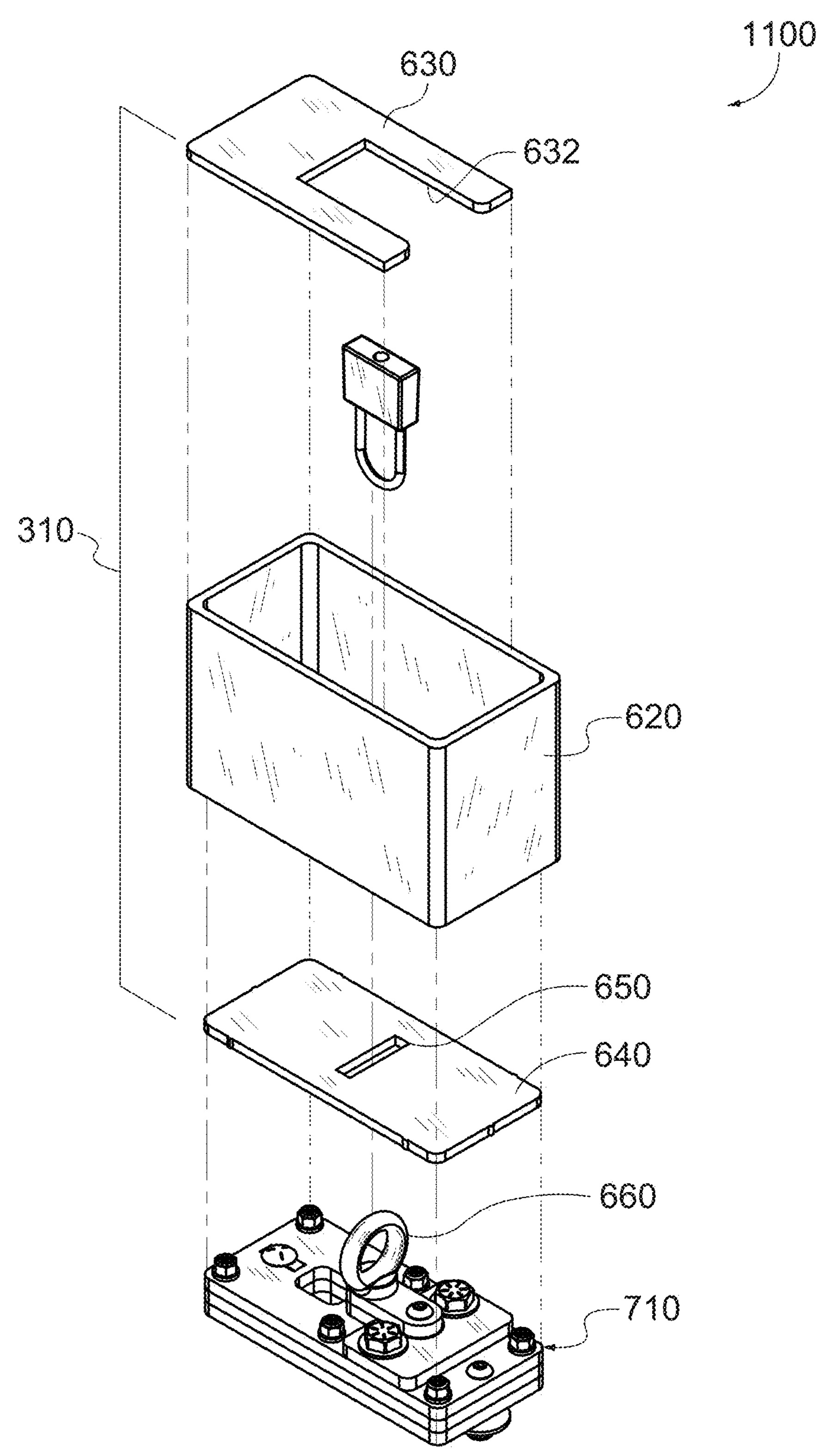
FIG. 11 illustrates an exploded perspective view of an embodiment of an anti-theft system, showing the vertical arrangement of lockbox components.

Referring to FIG. 11, an exploded perspective view 1100 of an embodiment of an anti-theft system illustrates the vertical arrangement and relationship of components that form the lockbox assembly. The exploded perspective view of an embodiment of an anti-theft system shows how the various structural elements stack together to create the complete enclosure that protects the tether clamping mechanism from unauthorized access.

The cover 630 is positioned at the top of the assembly and includes a lock access 632. The lock access 632 provides an opening configured to allow access to a lock mechanism, such as a keyhole or combination dials. The cover 630 forms the uppermost protective surface of the lockbox assembly when the components are assembled.

In an illustrative configuration, the perimeter 620 is positioned below the cover 630 and forms the sidewalls of the lockbox enclosure. The perimeter 620 may be formed from a section of steel tubing, such as rectangular tubing, that defines the outer boundary of the assembly. The perimeter 620 surrounds and protects the internal components of the lockbox when assembled, preventing access to the tether clamp from the sides of the enclosure.

With continued reference to FIG. 11, a hasp plate 640 is shown beneath the perimeter 620. The hasp plate 640 is positioned to cooperate with locking mechanisms and provides a structural element for securing the cover 630 to the base 320. Below the hasp plate 640, a staple hole 650 is illustrated. The staple hole 650 is configured to receive a staple 660 that extends upward through the opening.

Additionally, the staple 660 is shown as a U-shaped component with a threaded stud extending downward. The staple 660 is configured to pass through the staple hole 650 and engage with the locking mechanism. The threaded stud of the staple 660 allows the staple 660 to be secured to the base 320 from below, providing a fixed anchor point for the lock to engage.

In an illustrative configuration, the base 320 is positioned at the bottom of the assembly and is configured to adjustably secure a tether at a fixed location. The base 320 includes fastening hardware for clamping the tether in place. A cover 310 is shown on the left side of the assembly, representing an outer protective element that may be positioned over the lockbox components.

The exploded perspective view of an embodiment of an anti-theft system demonstrates how these components stack vertically and align along dashed centerlines to form the complete lockbox assembly when combined. The vertical stacking arrangement allows for straightforward assembly and disassembly during installation and service operations while maintaining structural integrity in the locked condition.

Figure 12:
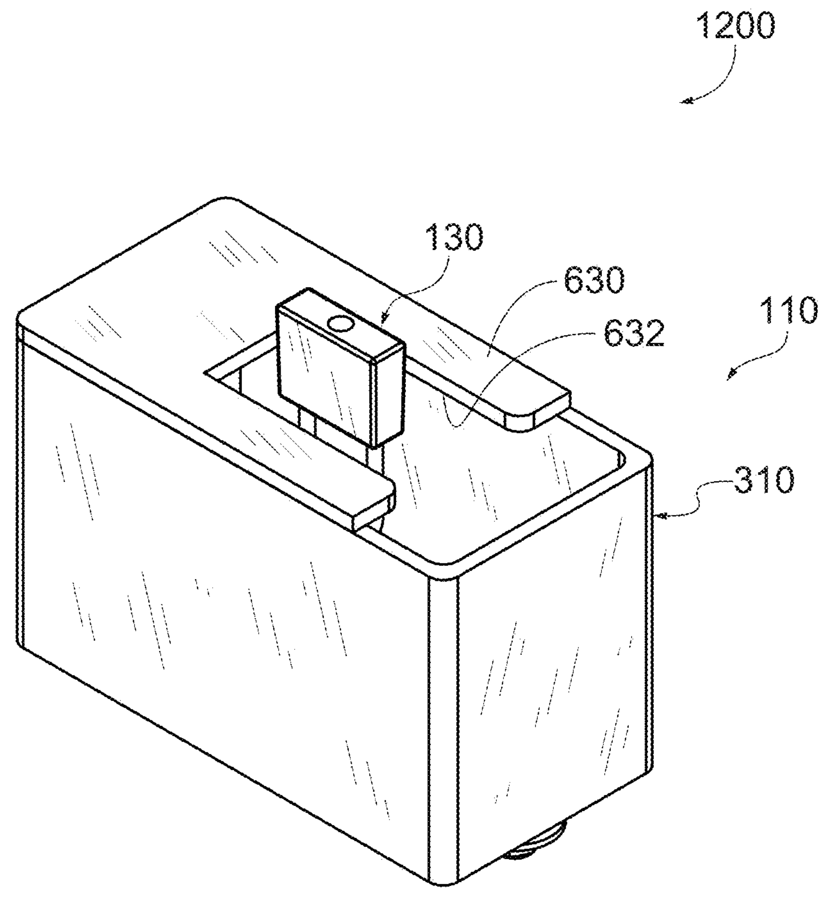
FIG. 12 illustrates a perspective view of an embodiment of an anti-theft system in an assembled configuration with the lock engaged.

Referring to FIG. 12, a perspective view 1200 of an embodiment of an anti-theft system illustrates the anti-theft system 110 in an assembled configuration. The anti-theft system 110 includes a cover 310 positioned on top of the assembly, providing protection for the internal components while maintaining accessibility for authorized users. The cover 630 forms part of the lockbox structure and includes a lock access 632, which is an opening configured to provide access to a keyhole or a set of combination dials of a lock 130. The lock 130 is positioned within the cover 630, with the lock access 632 allowing a user to operate the locking mechanism while the cover 310 remains in place over the base and tether clamp components.

With continued reference to FIG. 12, the perspective view of an embodiment of an anti-theft system demonstrates how the various components of the anti-theft system 110 are integrated to secure the protective cage to the backflow preventer while permitting authorized access through the lock 130. The lock 130 may be a combination lock that does not require keys, allowing landscapers or service personnel to avoid carrying keys during installation and maintenance operations. The lock access 632 accommodates the combination dials of the lock 130, enabling the user to input the correct combination sequence to disengage the lock 130 from the staple and transition the anti-theft system 110 from the locked condition to the service condition.

In an illustrative configuration, the lock 130 may be a Bluetooth-enabled electronic lock that permits wireless unlocking through a mobile device application. Additionally, the lock 130 may be a fingerprint recognition electronic lock that authenticates authorized users through biometric identification. Moreover, the lock 130 may be an RFID-enabled electronic lock that responds to proximity cards or key fobs carried by authorized personnel. The lock access 632 of the cover 630 is configured to accommodate these various lock types, providing flexibility in security options while maintaining the protective function of the anti-theft system 110 over the tether clamp and staple components housed within the lockbox assembly.

Figure 13:
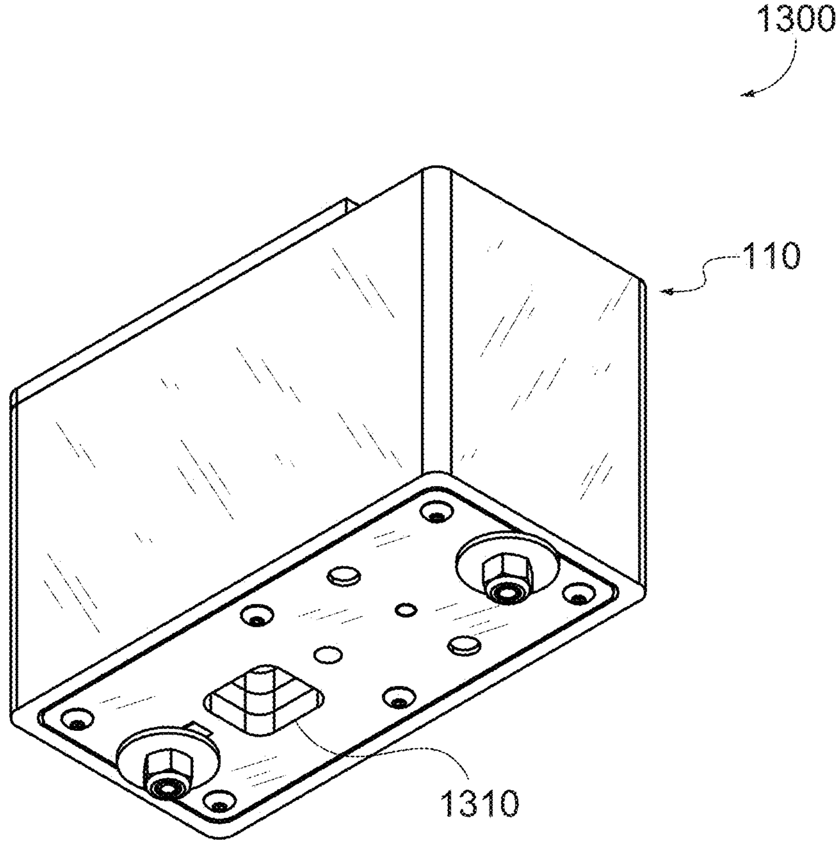
FIG. 13 illustrates a bottom perspective view of a lockbox, showing the window through which the tether passes.

FIG. 13 illustrates a bottom perspective view 1300 of the lockbox showing the anti-theft system 110 from an underside angle. The bottom perspective view of the lockbox reveals the configuration of the base assembly as the base assembly would appear when viewed from below the protective cage 20. The anti-theft system 110 includes a small window 1310 positioned on the bottom surface of the base assembly. The small window 1310 provides an opening through which the tether 120 passes from the backflow preventer 10 below through the protective cage 20 and into the lockbox assembly. The bottom perspective view of the lockbox shows the overall rectangular profile of the base with perimeter walls extending upward to form the enclosure that houses the tether clamp and associated securing components.

In an illustrative configuration, the small window 1310 may be located toward one end of the base assembly, allowing the tether 120 to enter the lockbox at a position that aligns with the attachment point on the backflow preventer 10 when the protective cage 20 is in place over the backflow preventer 10. The positioning of the small window 1310 accommodates the vertical path of the tether 120 as the tether 120 extends from the proximal end attached to the backflow preventer 10, through an opening in the expanded metal mesh of the protective cage 20, and into the anti-theft system 110 mounted on top of the protective cage 20. Additionally, the small window 1310 may be sized to permit passage of the tether 120 while restricting access to the internal clamping components from below, thereby maintaining the security function of the anti-theft system 110.

With continued reference to FIG. 13, the bottom perspective view of lockbox 1300 demonstrates how the anti-theft system 110 interfaces with the protective cage 20 from above while accommodating the tether 120 connection from below. Multiple fastener locations may be visible around the perimeter of the anti-theft system 110, indicating attachment points for securing the anti-theft system 110 to the protective cage 20. The central region of the anti-theft system 110 displays the openings and hardware associated with the tether clamping mechanism, with the small window 1310 positioned to allow the tether 120 to extend vertically from the backflow preventer 10 below. Consequently, the arrangement of the small window 1310 within the base assembly facilitates installation by permitting an installer to route the tether 120 through the protective cage 20 and into the lockbox without requiring modification to the protective cage 20 structure.

Figure 14:
FIG. 14 illustrates a top plan view of a lockbox, showing the lock engaged with the staple in the locked condition.
Figure 14:
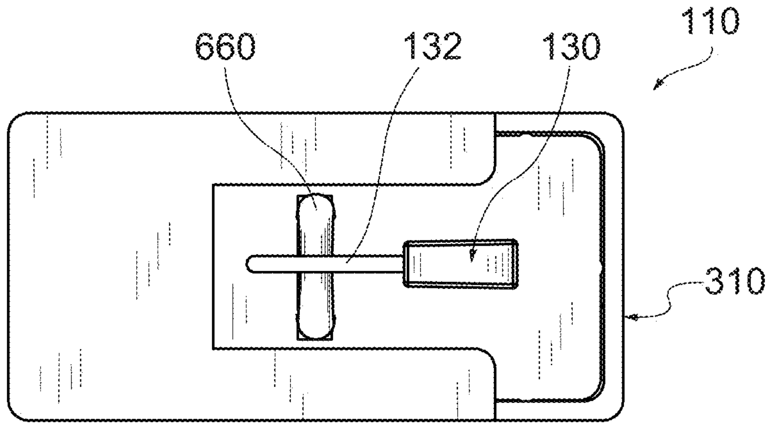

FIG. 14 illustrates a top plan view 1400 of the lockbox showing the anti-theft system 110 in the locked condition. The top plan view of the lockbox depicts the cover 310 positioned over the base assembly, with the staple 660 visible through an opening in the cover 310. The lock 130 is shown engaged with the staple 660, with the hasp 132 of the lock 130 passing through the staple 660 to secure the cover 310 to the base assembly. The spatial relationship between the lock 130 and the staple 660 demonstrates how the lock 130 secures the anti-theft system 110 in the locked condition. The cover 310 encloses the internal components of the lockbox while providing access for the lock 130 to engage with the staple 660.

In an illustrative configuration, the lock 130 may include a short shackle length. The short shackle length prevents the hasp 132 from being exposed beyond the protective enclosure of the cover 310. When the hasp 132 extends minimally beyond the body of the lock 130, the hasp 132 remains recessed within the anti-theft system 110, thereby reducing vulnerability to cutting with bolt cutters or a saw. The configuration of the lock 130 with the short shackle length positions the hasp 132 in proximity to the staple 660 when engaged, leaving insufficient clearance for cutting tools to access the hasp 132. Consequently, the short shackle length of the lock 130 enhances the security of the anti-theft system 110 by limiting exposure of the hasp 132 to potential tampering attempts.

Figure 15:
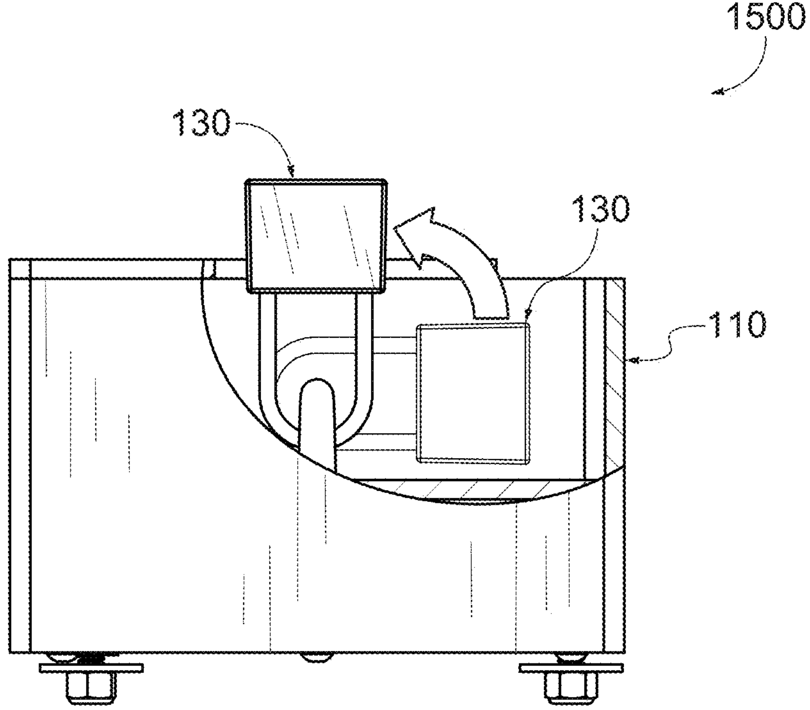
FIG. 15 illustrates a side view with breakout showing movement of the lock between open and closed positions.

FIG. 15 illustrates a side view 1500 with a breakout showing the movement of the lock. The side view with breakout showing movement of the lock depicts the anti-theft system 110 mounted on a protective cage, with the lock 130 shown in two positions to demonstrate the rotational movement of the lock 130 between an open position and a closed position. In the open position, the lock 130 extends upward from the anti-theft system 110, and in the closed position, the lock 130 is engaged with the anti-theft system 110. A curved arrow indicates the rotational movement of the lock 130 as the lock 130 transitions between the two positions. The anti-theft system 110 is shown positioned on top of the protective cage structure, which rests on adjustable feet at the base of the protective cage.

With continued reference to FIG. 15, the side view demonstrates how the lock 130 transitions between a service condition and a locked condition. In the service condition, the lock 130 is disengaged and access to the tether clamp is available, allowing an installer or service technician to adjust the tether or perform maintenance on the backflow preventer. In the locked condition, the lock 130 secures the anti-theft system 110 to prevent unauthorized access to the tether clamp and the associated components. The rotational movement of the lock 130 between the open position and the closed position corresponds to the transition between the service condition and the locked condition, respectively. The side view with breakout showing movement of the lock provides a visual representation of the operational states of the anti-theft system 110, illustrating how the lock 130 can be manipulated to permit authorized access while preventing unauthorized tampering when the lock 130 is in the closed position.

Figure 16:
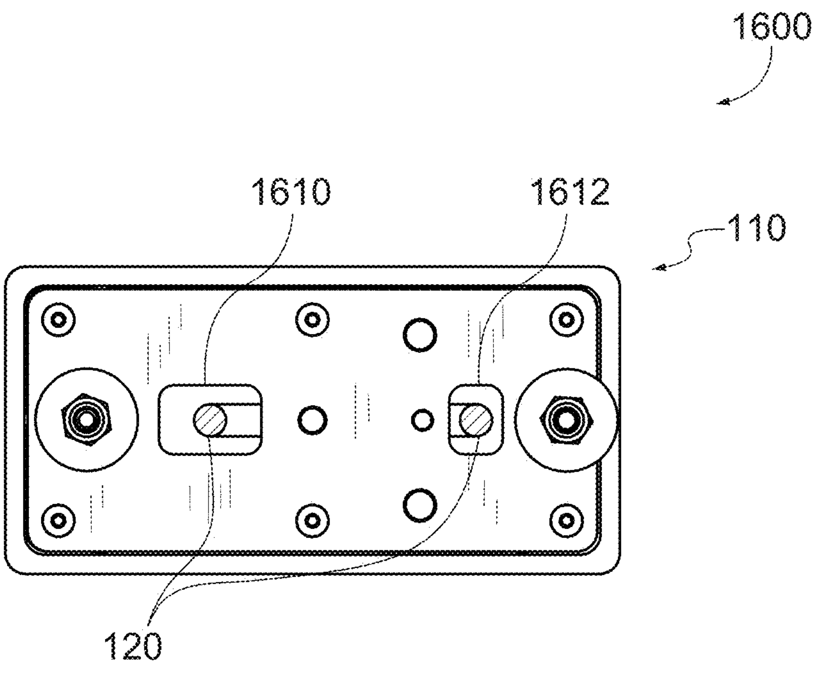
FIG. 16 illustrates a bottom plan view of a straight-path cable configuration, showing the window and return window for tether routing.

FIG. 16 illustrates a bottom plan view 1600 of a straight-path cable showing the anti-theft system 110 from below. The bottom plan view of a straight-path cable reveals the underside configuration of the anti-theft system 110, displaying the arrangement of components as the components would appear when viewing the anti-theft system 110 from beneath the protective cage 20. The tether 120 is shown in an installed position, extending through the anti-theft system 110. A window 1610 is visible on the bottom surface of the base assembly, providing an opening through which the tether 120 passes from the backflow preventer 10 below through the protective cage 20 and into the lockbox assembly. The window 1610 is located toward one end of the base assembly, allowing the tether 120 to enter the lockbox at a position that aligns with the attachment point on the backflow preventer 10 when the protective cage 20 is in place.

With continued reference to FIG. 16, a return window 1612 is positioned adjacent to the window 1610 and accommodates a return path of the tether 120 after the tether 120 has been secured by the tether clamp. The bottom plan view of a straight-path cable shows the spatial relationship between the window 1610 and the return window 1612, illustrating how the tether 120 can be routed through the anti-theft system 110 in a straight-path configuration. The window 1610 and the return window 1612 are positioned to allow the tether 120 to extend vertically from the backflow preventer 10 below and return through the protective cage 20 after being clamped. Multiple fastener locations are visible around the perimeter of the anti-theft system 110, indicating attachment points for securing the anti-theft system 110 to the protective cage 20.

In an illustrative configuration, the remaining wire rope of the tether 120 after clamping can be passed back through the return window 1612 and through the protective cage 20 to keep the remaining wire rope out of the way. This excess rope storage method allows an installer to route any surplus length of the tether 120 back down through the return window 1612 following the clamping operation, thereby preventing the remaining wire rope from interfering with the cover 310 or the lock 130. The return window 1612 thus serves a dual function of accommodating the tether 120 during installation and providing a pathway for storing excess tether length in a manner that maintains a clean appearance and reduces potential tampering access points.

Figure 17:
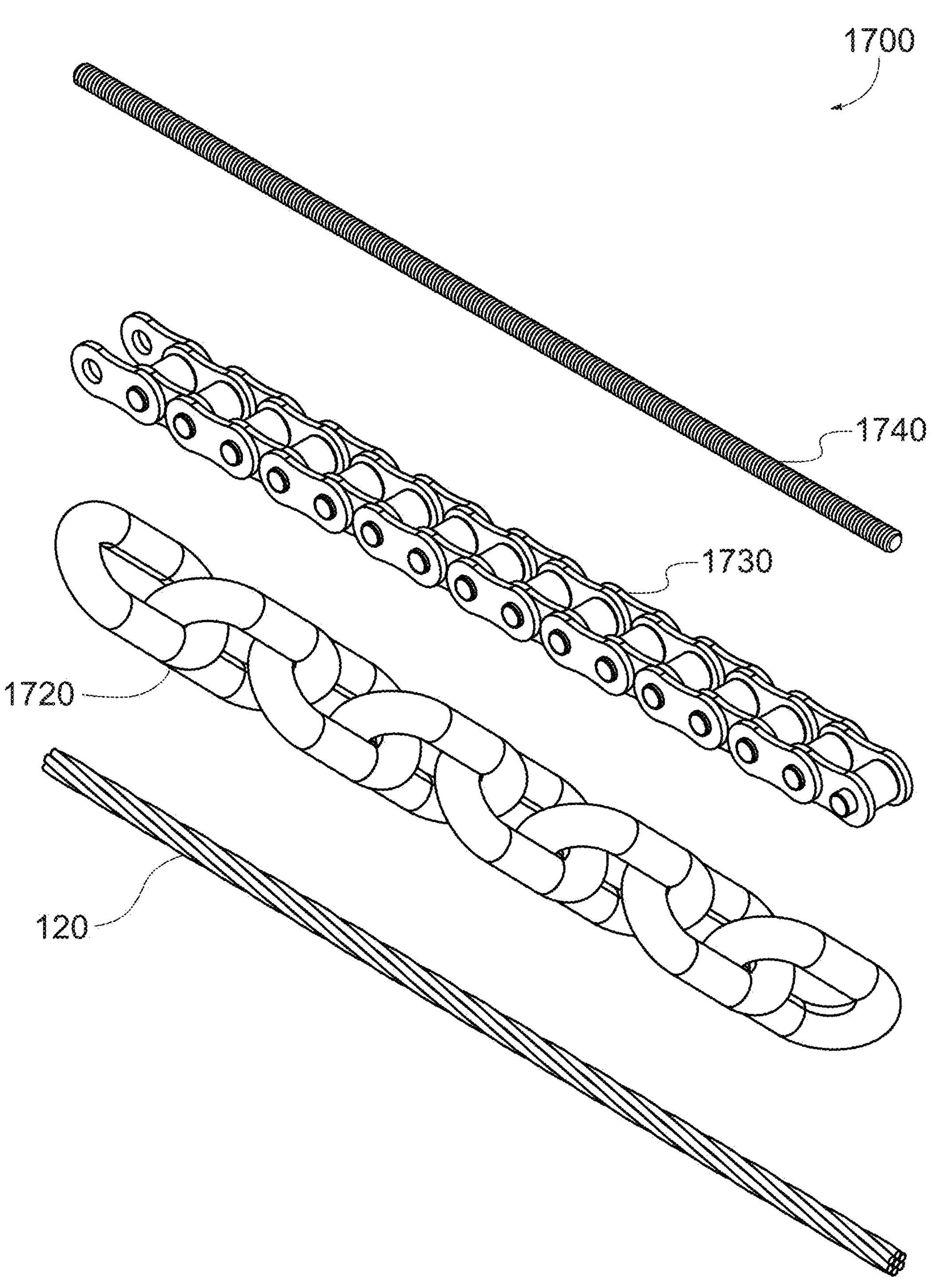
FIG. 17 illustrates a perspective view of various tethers including wire rope, link chain, and roller chain configurations.

FIG. 17 illustrates a perspective view 1700 of various tethers that may be used in the backflow preventer anti-theft system. The perspective view of various tethers depicts three different types of tethers suitable for securing a protective cage to a backflow preventer, each configured to pass through an opening of the protective cage and attach to the backflow preventer. The selection of tether type may depend on installation requirements, security considerations, and the specific configuration of the protective cage mesh openings.

Referring to FIG. 17, a tether 120 is shown as a wire rope including multiple strands twisted together. The wire rope tether 120 may use a 7×19 strand configuration to provide flexibility while maintaining strength. The 7×19 strand configuration includes seven bundles of nineteen individual wires each, resulting in a total of 133 wires that collectively provide tensile strength and resistance to cutting while permitting the tether 120 to bend around the backflow preventer and pass through the mesh openings of the protective cage. The wire rope tether 120 forms a loop at one end, which may be configured to engage the backflow preventer. As described previously, the tether may be wire rope, a chain, or a threaded rod.

In an illustrative configuration, a link chain 1720 is illustrated in FIG. 17, including a series of interlocking oval-shaped links that provide an alternative tether configuration. The link chain 1720 offers flexibility in multiple directions and terminates in a larger link at one end. The interlocking oval links of the link chain 1720 may be sized to pass through the expanded metal mesh openings of the protective cage while providing resistance to cutting tools. Additionally, the link chain 1720 may be a small diameter bike chain that can pass through the openings of the protective cage, with the individual links articulating to accommodate the path from the backflow preventer through the cage mesh to the lockbox.

With continued reference to FIG. 17, a roller chain 1730 is depicted, featuring a series of interconnected links with cylindrical rollers positioned between inner and outer plates. The roller chain 1730 provides a rigid yet articulating structure that may be used as a tether. The cylindrical rollers of the roller chain 1730 distribute stress across the chain structure and may provide additional resistance to cutting attempts. Moreover, the tether may be a long threaded rod that can pass through the openings of the protective cage, providing a rigid alternative to flexible tethers. The tether may also be a rod (e.g. a threaded rod 1740 that can pass through the openings of the protective cage, with the square cross-section providing resistance to rotation during tampering attempts. Each of the tethers shown in the perspective view of various tethers is configured to pass through an opening of the protective cage and attach to the backflow preventer, with the distal end secured by the tether clamp of the lockbox.

Figure 18:
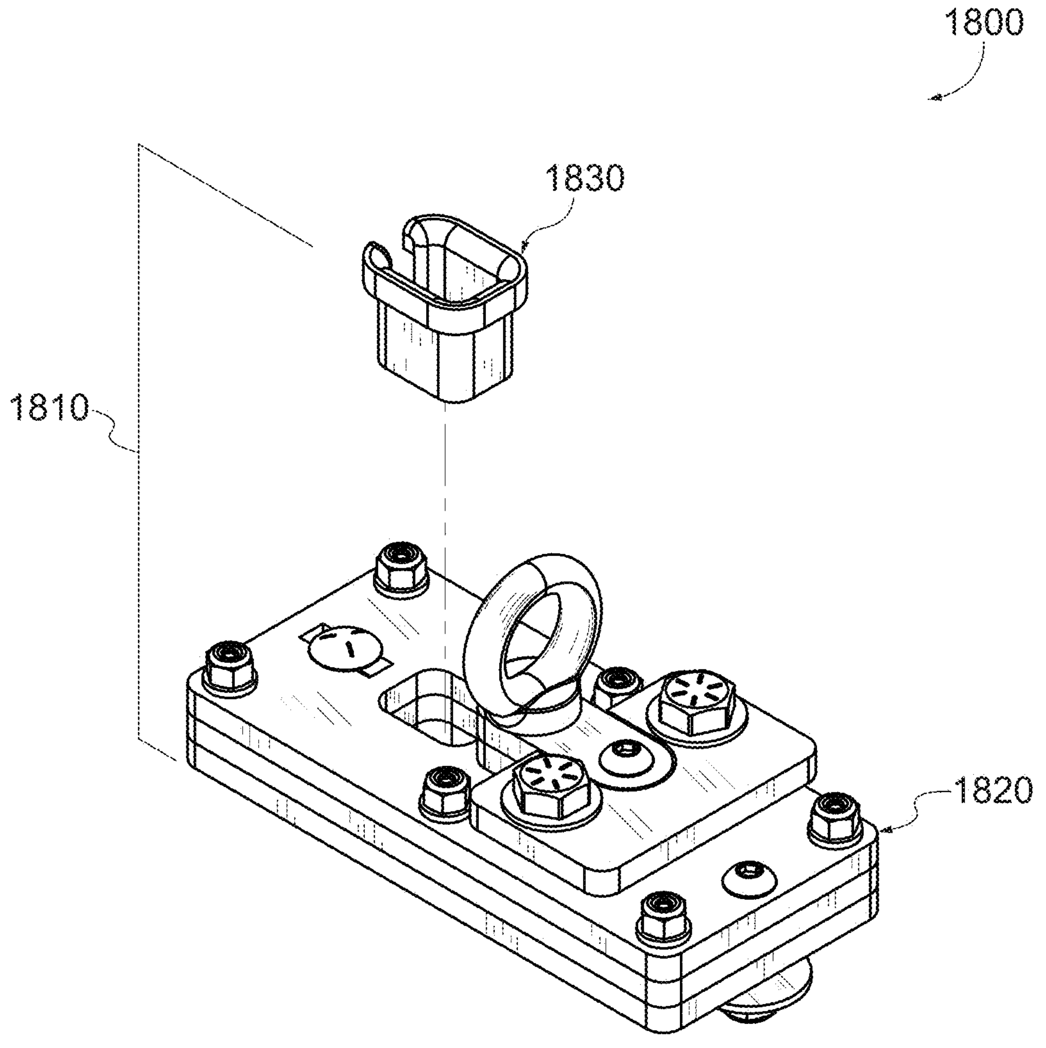
FIG. 18 illustrates an exploded view of the base plate assembly including a plastic 90-degree relief insert.

FIG. 18 illustrates an exploded view 1800 of a base plate assembly 1810 including a plastic 90-degree relief insert 1830. The view depicts on configuration of the plastic 90-degree relief insert 1830, however the design, materials, and features may be adapted as desired for the purpose of protecting a tether (not shown).

Figure 19:
FIG. 19 illustrates an assembled view of the baseplate assembly including a 90-degree relief insert.
Figure 19:
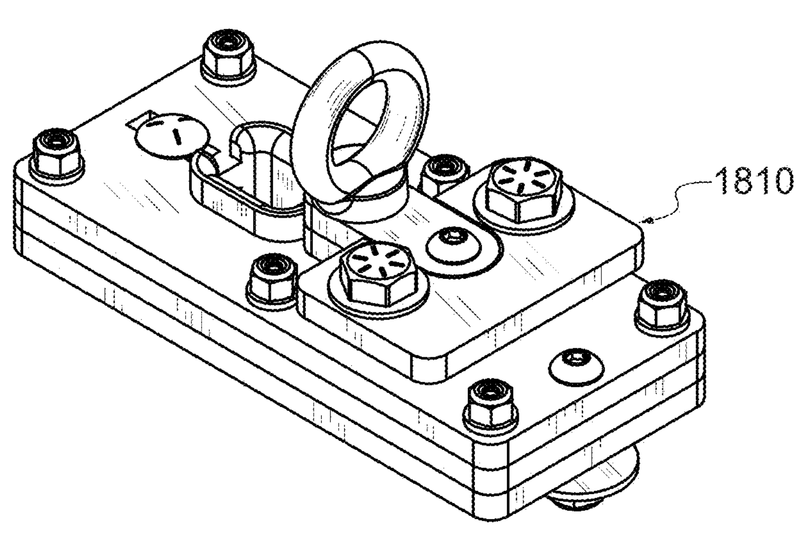

FIG. 19 illustrates a perspective view 1900 of the base plate assembly 1810 in an assembled condition.

Figure 20:
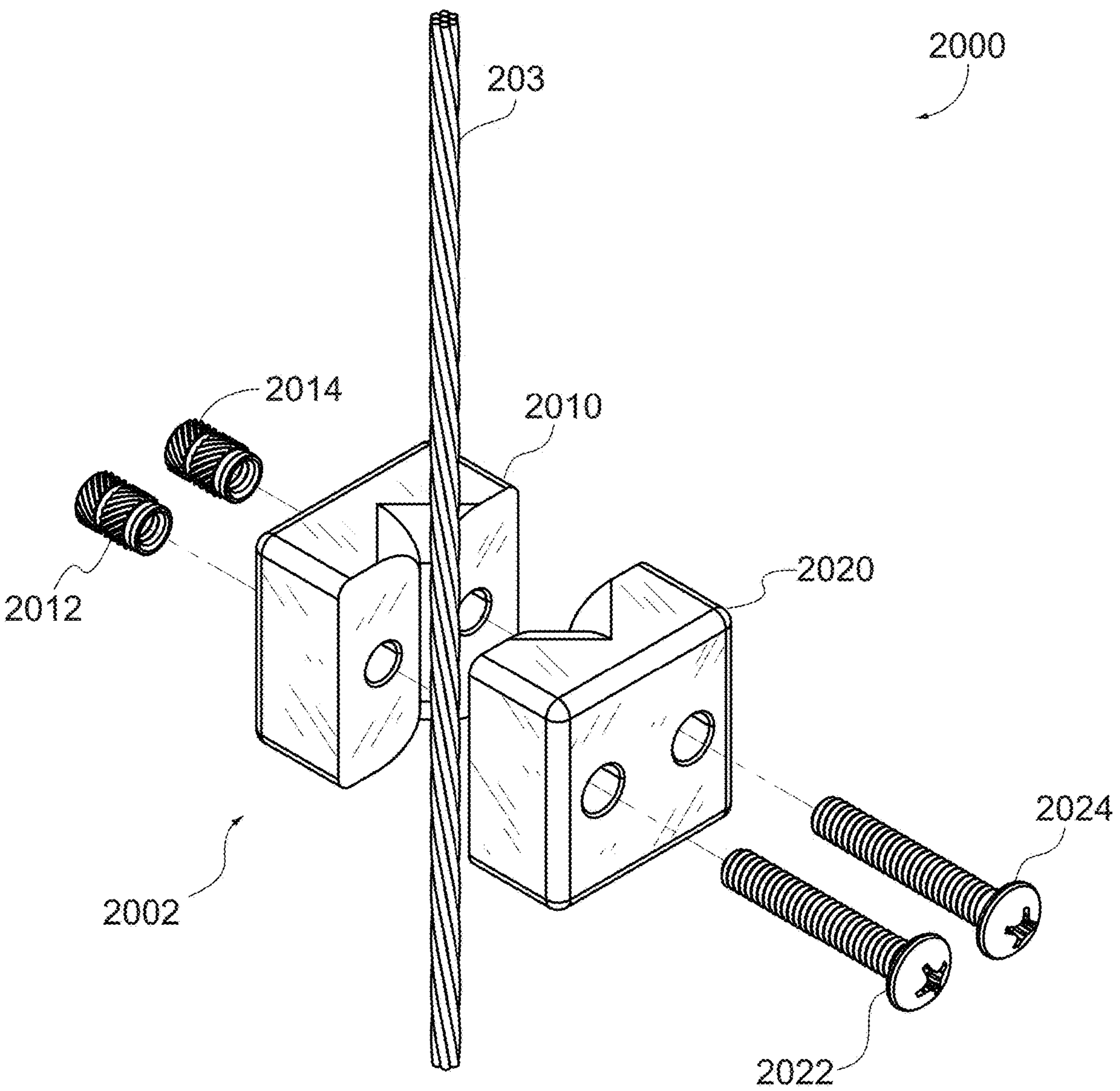
FIG. 20 illustrates an exploded view of the stop block assembly.

FIG. 20 illustrates an exploded view 2000 of a stop block assembly 2002. The stop block assembly 2002 may include a first half 2010 and a second half 2020 capable of fixedly attaching to a tether 2030. The first half 2010 may be fitted with a first threaded insert 2012 and a second threaded insert 2014. The second half 2020 may be configured to receive a first fastener 2022 and a second fastener 2024. The first and second fasteners 2022 and 2024 may cooperate with the threaded inserts 2012, 2014 to clamp to the cable 2030. Other variants of this stop block assembly 2002 may be provided, such as a crimp, a tube, a solder joint, or an of a large number of alternative.

The protective cage may be constructed from sturdy expanded metal material. In some configurations, the expanded metal material includes one-half inch spacing with #13 gauge thickness, providing a balance between structural rigidity and accessibility for the tether. The expanded metal material forms a diamond pattern with mesh openings sized to accommodate passage of the tether while maintaining physical protection for the backflow preventer housed within the protective cage. The distal end of the tether is configured to pass through an opening of expanded metal mesh of the protective cage, allowing the tether to extend from the backflow preventer inside the protective cage to the lockbox positioned on the exterior surface of the protective cage.

In an illustrative configuration, the protective cage is elevated above ground level on a pipe extending from the backflow preventer. The elevation may be approximately six inches above ground level, positioning the protective cage at a height that facilitates inspection and maintenance of the backflow preventer while providing clearance from the mounting surface. The pipe extending from the backflow preventer may have a diameter of approximately three-fourths of an inch, providing structural support for the protective cage and the associated anti-theft system components.

The protective cage may be fabricated from 304 stainless steel material. In configurations utilizing 304 stainless steel construction, all hinges, exposed hardware, and brackets associated with the protective cage may also be fabricated from 304 stainless steel. The stainless steel construction provides corrosion resistance suitable for outdoor installation environments where the protective cage is exposed to weather conditions and moisture. Additionally, stainless steel units may be sandblasted after fabrication to remove burrs, flashing, and sharp edges, with no exposed ends of expanded metal on the outside of the enclosure.

In an illustrative configuration, the protective cage includes a powder coat finish applied to the exterior surfaces. The powder coat finish may be green-colored, providing aesthetic options that blend with landscaping environments where backflow preventers are commonly installed. The powder coat treatment process may include preheating the unit and coating by electrostatic application of 2.0 to 3.5 mil thickness on all surfaces. The powder coat finish provides additional protection against environmental degradation while maintaining the structural integrity of the expanded metal mesh material.

Extending the central portion of the tether includes passing the tether through an opening of expanded metal mesh of the protective cage. The mesh openings formed by the expanded metal material are sized to permit passage of tether materials having a diameter of approximately one-quarter inch or less, accommodating wire rope, chain, or other tether configurations. The diamond pattern of the expanded metal mesh provides multiple potential passage points for the tether, allowing installation flexibility based on the positioning of the backflow preventer within the protective cage and the location of the lockbox on the exterior surface of the protective cage.

The base may be constructed from stainless steel material. Stainless steel provides corrosion resistance suitable for outdoor installations where the backflow preventer anti-theft system is exposed to environmental conditions, including moisture, temperature variations, and ultraviolet radiation. In some cases, the stainless steel is 304 stainless steel, which offers a balance of corrosion resistance and mechanical strength appropriate for security applications. Alternatively, 316 stainless steel may be used in installations where exposure to chlorides or other corrosive agents is anticipated.

In an illustrative configuration, the base components are manufactured using laser cutting processes. Laser cutting produces precise edges and accurate dimensional tolerances on the stainless steel plates. The laser cutting process accommodates the window openings, fastener holes, and adjustment slots formed in the base plates. Alternatively, plasma cutting may be used to manufacture the base components. Plasma cutting provides a cost-effective manufacturing method for stainless steel components while maintaining dimensional accuracy suitable for the anti-theft system assembly.

The fasteners for attaching the base to the protective cage may include button head hex socket cap screws. In some cases, the attachment fasteners are one-fourth-inch diameter fasteners with a twenty threads per inch thread pitch. The button head configuration provides a low-profile fastener head that reduces the opportunity for tampering tools to engage the fastener. The attachment fasteners extend through the base and through the expanded metal mesh of the protective cage, with nylon lock nuts and flat washers positioned beneath the cage surface to secure the base to the cage.

In an illustrative configuration, the clamp hardware includes hex head screw bolts for securing the tether within the tether clamp. The clamp fasteners may be three-eighths-inch diameter fasteners with a sixteen threads per inch thread pitch. The hex head configuration allows the installer to apply torque using a standard wrench or socket. Flat washers are positioned beneath the hex head to distribute clamping force across the clamp plate surface. The thread engagement depth provided by the stacked plate construction of the base allows the clamp fasteners to develop clamping force against the tether without stripping the threads.

The anti-theft system may include a block 1750 (FIG. 3) adjoining the proximal end of the tether and configured to maintain the loop of the tether around the backflow preventer. When the tether is formed from the wire rope and wrapped around a pipe portion of the backflow preventer, the wire rope exhibits a spring-like tendency due to the relatively small diameter of the pipe compared to the natural curvature of the wire rope. This spring-like tendency causes the wire rope to resist maintaining a tight loop configuration and may cause the loop to unwrap or shift position during installation of the protective cage.

In an illustrative configuration, the block is a stop block that attaches to the wire rope near the proximal end of the tether. The stop block prevents the wire rope from unwrapping and moving from the desired position on the backflow preventer pipe. The stop block may be positioned adjacent to the thimble eye at the proximal end of the tether, where the stop block engages the wire rope to counteract the spring-like forces that would otherwise cause the loop to expand or shift. The stop block maintains the loop of the tether in a fixed position around the backflow preventer, allowing an installer to position the protective cage over the backflow preventer without the tether moving from the attachment location.

The stop block may be formed by three-dimensional printing, which allows the stop block to be manufactured with a geometry that conforms to the wire rope profile. The stop block includes one or more screws on one side that secure the stop block to the wire rope. The screws pass through the stop block and engage the wire rope strands, clamping the stop block in position along the length of the wire rope. The screws are tightened to hold the stop block in place without over-compressing the wire rope, allowing the wire rope to retain flexibility while preventing the stop block from sliding along the wire rope. The stop block remains attached to the wire rope as a permanent component of the tether assembly after installation is complete.

A method for securing a protective cage to a backflow preventer using an anti-theft system includes a series of steps that result in the protective cage being tethered to the backflow preventer and locked in place. The method provides an approach for augmenting an existing protective cage to add additional security by attaching the top of the protective cage to the backflow preventer.

The method includes attaching a proximal end of a tether to the backflow preventer inside the protective cage. In some cases, attaching the proximal end of the tether to the backflow preventer includes engaging a loop of the tether around the backflow preventer. The loop may be formed by passing the tether through a thimble and wrapping the tether around a pipe portion of the backflow preventer. The loop configuration allows the tether to be secured to the backflow preventer without permanent modification to the backflow preventer or the protective cage. In some cases, a block may be positioned adjacent to the loop to maintain the loop of the tether around the backflow preventer and prevent the tether from unwinding or shifting position.

The method further includes extending a central portion of the tether through an opening of the protective cage. The opening may be formed by the mesh pattern of the protective cage, such as an opening in expanded metal mesh material. The central portion of the tether passes through the mesh opening in a direction extending from the interior of the protective cage toward the exterior of the protective cage. The tether may be a wire rope, a chain, or a threaded rod, and the diameter of the tether is selected to pass through the mesh openings of the protective cage.

The method additionally includes positioning a distal end of the tether outside the protective cage. The distal end of the tether extends upward through the protective cage and is positioned above the top surface of the protective cage. The distal end of the tether is accessible from outside the protective cage for engagement with the lockbox components.

In an illustrative configuration, the method includes adjoining a base of a lockbox to the protective cage. The base may be positioned on top of the protective cage with an opening in the base aligned with the location where the tether passes through the protective cage. The base may be secured to the protective cage using one or more fasteners that extend through the protective cage. The base may include a contour that mirrors a profile of the protective cage, and the base may be stabilized against a curved surface of the protective cage using a plurality of button head fasteners.

The method includes adjustably securing the tether at a fixed location on the central portion of the tether using a tether clamp of the base. The tether clamp applies pressure to the central portion of the tether to hold the tether in a fixed position relative to the base. The tether clamp may include fasteners that are tightened to apply clamping force against the tether. The adjustable nature of the tether clamp allows an installer to pull the tether tight before securing the tether in place, thereby removing slack from the tether and securing the protective cage to the backflow preventer. In some cases, a guide of the base may direct the tether to prevent kinking of the tether as the tether transitions through the base.

The method further includes engaging a lock with a staple of the base. The staple extends from the base and is configured to receive a hasp of the lock. The lock may be a combination lock or a keyed lock, and the lock secures the cover to the base when engaged with the staple.

The method includes lockably attaching a cover to the base, the cover including a hasp cooperatively associated with the staple of the base. The cover is positioned over the base, and the hasp of the cover engages with the staple. When the lock is engaged with the staple, the cover is secured to the base, and access to the tether clamp is restricted. The cover may include a lock access configured to provide access to a keyhole or a set of combination dials, allowing an authorized user to operate the lock without removing the cover.

The method for securing the protective cage to the backflow preventer may include contouring the base to mirror a profile of the protective cage. The protective cage typically includes a curved surface that forms an arched profile over the backflow preventer. The base of the lockbox may be configured with a contour that corresponds to the curvature of the protective cage, allowing the base to sit flush against the curved surface of the protective cage. The contouring of the base may be achieved through machining, forming, or selecting a base geometry that matches the radius of curvature of the protective cage. In some cases, the base includes a bottom surface that follows the arc of the protective cage profile, thereby distributing contact forces across a larger area and reducing stress concentrations at the interface between the base and the protective cage.

In an illustrative configuration, the method further includes stabilizing the base against a curved surface of the protective cage using a plurality of button head fasteners. The button head fasteners may extend from the underside of the base and contact the curved surface of the protective cage at multiple points. The button head fasteners provide discrete contact points that accommodate variations in the curvature of the protective cage while maintaining stable positioning of the base. The plurality of button head fasteners may be arranged symmetrically about a centerline of the base to provide balanced support. Additionally, the low-profile heads of the button head fasteners reduce the likelihood of interference with adjacent components and minimize exposed surfaces that could be targeted for tampering.

The method may further include securing the base to the protective cage by extending at least a first fastener through the protective cage. The first fastener may pass through an opening in the base, through the expanded metal mesh of the protective cage, and may be secured from below using a washer and a nut. The washer distributes the clamping force across a larger area of the cage material, reducing the risk of damage to the expanded metal mesh. The nut threadably engages the first fastener to draw the base tightly against the protective cage. Consequently, the combination of the contoured base, the plurality of button head fasteners for stabilization, and the first fastener extending through the protective cage provides a secure attachment that resists tampering, tilting, and removal attempts while maintaining the structural integrity of the protective cage.

The anti-theft system includes a method for accessing the lock and guiding the tether during installation and service operations. The cover of the lockbox includes a lock access configured to provide access to a keyhole or a set of combination dials. During operation, a user may access the keyhole or the set of combination dials through the lock access of the cover. The lock access allows the user to operate the lock mechanism without removing the cover from the base, thereby maintaining the security of the internal components while permitting authorized access. In some cases, the lock access is sized and positioned to accommodate various lock types, including keyed padlocks and combination padlocks. The user inserts a key into the keyhole or manipulates the set of combination dials through the lock access to transition the anti-theft system between the locked condition and the service condition.

In an illustrative configuration, the base of the lockbox includes a guide configured to prevent kinking of the tether. During installation, the tether is guided through the guide of the base to prevent kinking of the tether. The guide provides a curved or radiused surface that allows the tether to transition smoothly between different orientations as the tether passes through the base. The guide may be positioned adjacent to a window in the base through which the tether extends. By guiding the tether through the guide, the installer maintains the structural integrity of the tether and prevents damage that could otherwise result from sharp bends or kinks. The guide accommodates the natural stiffness of the tether material, whether the wire rope, chain, or other tether types, and directs the tether along a path that minimizes stress concentrations. In some cases, the guide includes a top guide and a bottom guide that cooperate to define a channel through which the tether passes, thereby maintaining proper tether alignment throughout the installation process and during subsequent operation of the anti-theft system.

The methods, systems, devices, graphs, and/or tables are illustrative examples, and configurations may omit, substitute, or add various procedures or components as appropriate. For instance, the methods may be reordered in alternative configurations, and/or various stages may be added, omitted, and/or combined. Alternatively, features described with respect to certain configurations may be in various alternative configurations. Different aspects and elements of the configurations may be combined similarly. Also, technology evolves; thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or more than one (i.e., to at least one) of the grammatical object of the article. By way of example, "an element" means one element or more than one element. "About" and/or "approximately" as used herein when referring to a measurable value such as an amount, a temporal duration, and the like encompass variations of ±20% or ±10%, ±5%, or ±0.1% from the specified value as such variations are appropriate in the context of the systems, devices, circuits, methods, and other implementations described herein. "Substantially," as used herein when referring to a measurable value such as an amount, a temporal duration, a physical attribute (such as frequency), and the like, also encompasses variations of ±20% or ±10%, ±5%, or ±0.1% from the specified value as such variations are appropriate in the context of the systems, devices, circuits, methods, and other implementations described herein.

As used herein, including in the claims, "and" as used in a list of items prefaced by "at least one of" or "one or more of" indicates that any combination of the listed items may be utilized. For example, a list of "at least one of A, B, and C" includes any of the combinations A, B, C, AB, AC, BC, and/or ABC (i.e., A, B, and C). Furthermore, to the extent that more than one occurrence or use of the items A, B, or C is possible, multiple uses of A, B, and/or C may form part of the contemplated combinations. For example, a list of "at least one of A, B, and C" may include AA, AAB, AAA, BB, etc.

While illustrative and presently preferred embodiments of the disclosed systems, methods, and/or machine-readable media have been described in detail herein, it is to be understood that the inventive concepts may be otherwise variously embodied and employed and that the appended claims are intended to be construed to include such variations except as limited by the prior art. While the principles of the disclosure have been provided in connection with specific apparatuses and methods, it is to be clearly understood that this description is made only by way of example and not as a limitation on the scope of the disclosure.

What is claimed is:

1. A backflow preventer anti-theft system for securing a protective cage to a backflow preventer, the backflow preventer anti-theft system comprising:

a tether comprising:

a proximal end configured to attach to the backflow preventer inside the protective cage;

a distal end outside the protective cage; and a central portion extending between the proximal end and the distal end and configured to extend through an opening of the protective cage;

a lockbox comprising:

a base configured to adjoin the protective cage, the base comprising:

a tether clamp configured to adjustably secure the tether at a fixed location on the central portion of the tether; and a staple configured to receive a lock;

a cover configured to lockably attach to the base, the cover comprising:

a hasp cooperatively associated with the staple of the base;

a service condition, wherein the lock is disengaged from the staple and the tether clamp is operable; and a locked condition, wherein the tether clamp fixes the tether to the base and the staple is engageable with the lock.

2. The backflow preventer anti-theft system of claim 1, wherein the tether is a wire rope, a chain, or a threaded rod.

3. The backflow preventer anti-theft system of claim 1, wherein the proximal end of the tether comprises:

a loop configured to engage the tether to the backflow preventer.

4. The backflow preventer anti-theft system of claim 1, wherein the cover of the lockbox comprises:

a lock access configured to provide access to a keyhole or a set of combination dials.

5. The backflow preventer anti-theft system of claim 1, wherein the base comprises:

a guide configured to prevent kinking of the tether.

6. The backflow preventer anti-theft system of claim 1, wherein the central portion of the tether is configured to pass through an opening of expanded metal mesh of the protective cage.

7. The backflow preventer anti-theft system of claim 1, wherein the proximal end of the tether comprises:

a thimble eye.

8. The backflow preventer anti-theft system of claim 1, further comprising:

a block adjoining the proximal end of the tether and configured to maintain a loop of the tether around the backflow preventer.

9. The backflow preventer anti-theft system of claim 1, wherein the base comprises:

a slot configured to accommodate varying expanded metal mesh spacing patterns.

10. The backflow preventer anti-theft system of claim 1, wherein the base is secured to the protective cage by at least a first fastener extending through the protective cage.

11. The backflow preventer anti-theft system of claim 1, wherein the base of the lockbox comprises:

a contour that mirrors a profile of the protective cage.

12. The backflow preventer anti-theft system of claim 11, wherein the contour comprises:

a plurality of button head fasteners configured to stabilize the base against a curved surface of the protective cage.

13. A method for securing a protective cage to a backflow preventer using an anti-theft system, the method comprising:

attaching a proximal end of a tether to the backflow preventer inside the protective cage;

extending a central portion of the tether through an opening of the protective cage;

positioning a distal end of the tether outside the protective cage;

adjoining a base of a lockbox to the protective cage;

adjustably securing the tether at a fixed location on the central portion of the tether using a tether clamp of the base;

engaging a lock with a staple of the base; and lockably attaching a cover to the base, the cover comprising a hasp cooperatively associated with the staple of the base.

14. The method of claim 13, wherein extending the central portion of the tether comprises:

passing the tether through an opening of expanded metal mesh of the protective cage.

15. The method of claim 13, wherein attaching the proximal end of the tether to the backflow preventer comprises:

engaging a loop of the tether around the backflow preventer.

16. The method of claim 13, further comprising:

accessing a keyhole or a set of combination dials through a lock access of the cover.

17. The method of claim 13, further comprising:

guiding the tether through a guide of the base to prevent kinking of the tether.

18. The method of claim 13, further comprising:

securing the base to the protective cage by extending at least a first fastener through the protective cage.

19. The method of claim 13, further comprising:

contouring the base to follow a profile of the protective cage.

20. The method of claim 19, further comprising:

stabilizing the base against a curved surface of the protective cage using a plurality of button head fasteners.

* * * * *